(12) United States Patent
White et al.

(10) Patent No.: US 6,496,205 B1
(45) Date of Patent: *Dec. 17, 2002

(54) USER INTERFACE FOR CONTROLLING AUDIO FUNCTIONS IN A WEB BROWSER

(75) Inventors: Christopher M. White, San Francisco, CA (US); Mark H. Krueger, Fukuoka (JP); David R. Anderson, Cupertino, CA (US); Jeffrey D. Yaksick, Sunnyvale, CA (US); Joe F. Britt, Jr., Saratoga, CA (US)

(73) Assignee: Webtv Networks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,681

(22) Filed: Dec. 21, 1999

Related U.S. Application Data

(63) Continuation of application No. 08/755,237, filed on Nov. 22, 1996, now Pat. No. 6,005,563, which is a continuation-in-part of application No. 08/660,088, filed on Jun. 3, 1996, now Pat. No. 6,034,689.

(51) Int. Cl.[7] ............................................. G06F 17/30
(52) U.S. Cl. ...................................... 345/824; 345/716
(58) Field of Search ................................ 345/326–358, 345/716–729, 749, 854, 739, 760, 747, 768, 84.824; 709/230; 707/10

(56) References Cited

U.S. PATENT DOCUMENTS

| 4,575,579 A | 3/1986 | Simon et al. .................. 178/4 |
| 4,852,151 A | 7/1989 | Dittakavi et al. ............. 379/97 |
| 4,922,523 A | 5/1990 | Hashimoto ................... 379/96 |
| 4,975,944 A | 12/1990 | Cho ............................ 379/209 |
| 4,995,074 A | 2/1991 | Goldman et al. ............. 379/97 |

(List continued on next page.)

OTHER PUBLICATIONS

Matt Rosoff, Review: "Gateway Destination PC," c/net inc., 2 pages, Feb. 19, 1996.
Robert Seidman, Article: "What Larry and Lou Know (That You Don't)," c/net inc., 2 pages, Jan. 29, 1996.
Susan Stellin, Article: "The $500 Web Box: Less is More?" c/net inc., 2 pages, 1996.

(List continued on next page.)

*Primary Examiner*—Steven Sax
(74) *Attorney, Agent, or Firm*—Workman, Nydegger & Seeley

(57) ABSTRACT

Web browser software is implemented in a processing system housed in a set-top box connected to a television and communicating over a wide-area network with one or more servers. The browser allows a user to use a remote control device to navigate between hypertex, anchors in World-Wide Web pages displayed on the television. User inputs are entered from the remote control device using an infrared IR link in order to move a selection between hypertext anchors or various control buttons displayed on the television display. The browser is capable of downloading audio files from Web sites and generating sound through a speaker of the television set based on the audio files. Background music is generated during Web browsing based on audio files downloaded from one of the servers or audio files stored in memory in the set-top box. A background music audio file from a server can be downloaded while another background music audio file is played. An audio panel can be displayed when an audio file from a Web site is downloaded and played to form a user interface by which the user to play, stop, pause, rewind, or fast-forward the audio file.

27 Claims, 19 Drawing Sheets

U.S. PATENT DOCUMENTS

| | | | |
|---|---|---|---|
| 5,005,011 A | 4/1991 | Perlman et al. | 340/728 |
| 5,095,494 A | 3/1992 | Takahashi et al. | 375/10 |
| 5,220,420 A | 6/1993 | Hoarty et al. | 358/86 |
| 5,241,587 A | 8/1993 | Horton et al. | 379/93 |
| 5,263,084 A | 11/1993 | Chaput et al. | 379/215 |
| 5,287,401 A | 2/1994 | Lin | 379/98 |
| 5,299,307 A | 3/1994 | Young | 395/161 |
| 5,325,423 A | 6/1994 | Lewis | 379/90 |
| 5,341,293 A | 8/1994 | Vertelney et al. | 364/419.17 |
| 5,369,688 A | 11/1994 | Tsukamoto et al. | 379/100 |
| 5,410,541 A | 4/1995 | Hotto | 370/76 |
| 5,425,092 A | 6/1995 | Quirk | 379/215 |
| 5,469,540 A | 11/1995 | Powers, III et al. | 395/158 |
| 5,488,411 A | 1/1996 | Lewis | 348/8 |
| 5,490,208 A | 2/1996 | Remillard | 379/96 |
| 5,530,852 A | 6/1996 | Meske, Jr. et al. | 395/600 |
| 5,538,255 A | 7/1996 | Barker | 463/41 |
| 5,557,724 A * | 9/1996 | Sampat et al. | 382/100 |
| 5,558,339 A | 9/1996 | Perlman | 463/42 |
| 5,561,709 A | 10/1996 | Remillard | 379/96 |
| 5,564,001 A | 10/1996 | Lewis | 395/154 |
| 5,586,257 A | 12/1996 | Perlman | 463/42 |
| 5,611,038 A * | 3/1997 | Shaw et al. | 345/716 |
| 5,612,730 A | 3/1997 | Lewis | 348/8 |
| 5,629,733 A | 5/1997 | Youman et al. | 348/7 |
| 5,701,451 A | 12/1997 | Rogers et al. | 395/600 |
| 5,706,502 A | 1/1998 | Foley et al. | 395/610 |
| 5,710,918 A | 1/1998 | Lagarde et al. | 395/610 |
| 5,715,412 A | 2/1998 | Aritsuka et al. | 345/326 |
| 5,717,860 A | 2/1998 | Graber et al. | 395/208.12 |
| 5,745,909 A | 4/1998 | Perlman et al. | 707/513 |
| 5,752,246 A | 5/1998 | Rogers et al. | 707/10 |
| 5,793,964 A | 8/1998 | Rogers et al. | 395/200.32 |
| 5,799,063 A | 8/1998 | Frare | 379/67 |
| 5,884,262 A * | 3/1999 | Wise et al. | 704/270 |
| 5,884,284 A * | 3/1999 | Peters et al. | 705/30 |
| 5,892,938 A * | 4/1999 | Eastty et al. | 345/749 |
| 5,903,727 A * | 5/1999 | Nielsen | 345/749 |
| 5,905,865 A * | 5/1999 | Palmer et al. | 345/738 |
| 5,913,062 A * | 6/1999 | Vrvilo et al. | 395/681 |
| 5,953,005 A * | 9/1999 | Liu | 345/302 |
| 5,963,916 A * | 10/1999 | Kaplan | 705/26 |
| 5,999,173 A * | 12/1999 | Ubillos | 345/723 |
| 6,005,563 A * | 12/1999 | White et al. | 345/327 |
| 6,035,341 A * | 3/2000 | Nunally et al. | 709/253 |
| 6,052,710 A * | 4/2000 | Saliba et al. | 709/203 |
| 6,223,188 B1 * | 4/2001 | Albers et al. | 707/501 |
| 6,225,993 B1 * | 5/2001 | Lindblad et al. | 345/716 |
| 6,354,748 B1 * | 3/2002 | Vrvilo | 345/735 |
| 6,363,159 B1 * | 3/2002 | Rhoads | 382/100 |

OTHER PUBLICATIONS

"RealAudio client 3.0", Dialog(R) File 248:PIRA, (c) 1997 Pira International, 1 pg.

"Real Progress: The Internet As Information Utility", Dialog(R) File 248:PIRA, (c) 1997 Pira International, 1 pg.

"Digital Audio And Disabled Learners", Dialog(R) File 2:Inspec (c) 1997 Institution of Electrical Engineers, 1 pg.

"Emerging Technologies—New Opportunities in Platforms", Dialog(R) File 647:CMP (c) 1997 CMP, 1 pg.

* cited by examiner

USER INTERFACE FOR CONTROLLING AUDIO FUNCTIONS IN A WEB BROWSER

CROSS-REFERENCE TO RELATED APPLICATIONS

The present application is a continuation of U.S. patent application Ser. No. 08/755,237, filed on Nov. 22, 1996 and now issued as U.S. Pat. No. 6,005,563, which is a continuation-in-part of U.S. patent application Ser. No. 08/660,088, filed on Jun. 3, 1996, now issued as U.S. Pat. No. 6,034,689.

FIELD OF THE INVENTION

The present invention pertains to the field of browser software for browsing the World Wide Web. More particularly, the present invention relates to audio functions in a Web browser.

BACKGROUND OF THE INVENTION

The number of homes and businesses using personal computers has increased substantially in recent years, and along with this increase has come an explosion in the use of the Internet, and particularly the World-Wide Web ("the Web"). The Web is a collection of formatted hypertext pages located on numerous computers around the world that are logically connected by the Internet. Although "the Web" has in the past been a source of primarily scientific and technical information, it is now a valuable resource for information relating to almost any subject, including business, entertainment, travel, and education, to name just a few. Advances in network technology, and especially in software such as "Web browsers" (software applications which provide a user interface to the Web), have made the Web accessible to a large segment of the population. However, despite the growth in the development and use of the Web, many people are still unable to take advantage of this important resource.

Access to the Web has been limited to people who have access to a personal computer. Yet some people cannot afford the cost of even a relatively inexpensive personal computer, while others are unable or unwilling to learn the basic computer skills that are required to access the Web. Furthermore, Web browsers in the prior art generally do not provide the degree of user-friendliness desired by some people who lack computer experience, and many computer novices do not have the patience to learn how to use the software. Some people, for example, dislike an interface which requires them to identify hypertext objects and use the point-and-click technique to browse through Web pages.

Most people, however, feel quite comfortable using a remote control to operate a television set. Therefore, it would be desirable to allow a person to access the World-Wide Web without the use of a personal computer. In particular, it would be desirable for a person to be able to access and navigate through Web pages using an ordinary television set and a remote control. It would further be desirable to have a user interface by which a person can use a remote control to navigate between hypertext objects on a Web page with minimal effort or thought, so that a person feels more as if he or she is simply changing television channels rather than utilizing a complex computer network.

Another problem associated with Web browsers is that they tend to provide minimal audio functionality. Audio files linked to Web pages are becoming increasingly more common. Although some Web browsers may provide capability to download and play audio files, they generally do not provide capability to manipulate audio data to any significant extent. In addition, Web browser user interfaces generally are not set up to facilitate audio functionality.

SUMMARY OF THE INVENTION

A method is provided of processing audio information in a client processing system that is capable of being coupled to a server processing system over a network and is capable of being coupled to an audio output device. In the method, a first audio sequence is output via the audio output device based on a first audio file stored in the client processing system. A second audio file, which represents a second audio sequence that is to be output following output of the first audio sequence, is downloaded into the client processing system from the network while the first audio sequence is being output. The second audio file is transmitted from the server processing system to the client processing system over the network.

Another aspect of the present invention is a method of providing a user interface for controlling audio functions of a client processing system. The client processing system is coupled to a server processing system over a network and to a display device. In the method, audio information is downloaded from the network, and an audio control panel is displayed on the display device. The audio control panel includes a number of images, each of which is for activating one of a number of audio functions for manipulating the downloaded audio information.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

A method and apparatus for providing a user interface to control audio functions in a Web browser are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In one embodiment, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

The present invention relates to a system in which a set-top box is connected to a television and to one or more servers over the Internet. The set-top box includes a processing system that executes browser software to enable a user to browse through World-Wide Web pages displayed on the television using a remote control device. As will be described below, the browser provides a user interface that includes an audio panel for controlling audio functions related to audio files downloaded from the Web. In addition, the Web browser provides a continuous stream of background music to the user during Web browsing by downloading audio files from a server while other audio is being played to the user.

In one embodiment, the present invention is included in a system known as WebTV™ (WebTV), which uses a standard television set as a display device for browsing the Web and which connects to a conventional network, such as the Internet, using standard telephone, ISDN, or similar communication lines. In accordance with the present invention, a user of a WebTV client system can utilize WebTV network services provided by one or more remote WebTV servers. The WebTV network services are used in conjunction with software running in a WebTV client system to browse the Web, send electronic mail, and to make use of the Internet in various other ways. The WebTV servers function as proxies by retrieving, from a remote server, Web pages or other data requested by a WebTV client system and then transmitting the requested information to the WebTV client system.

I. System Overview

Figure 1A:
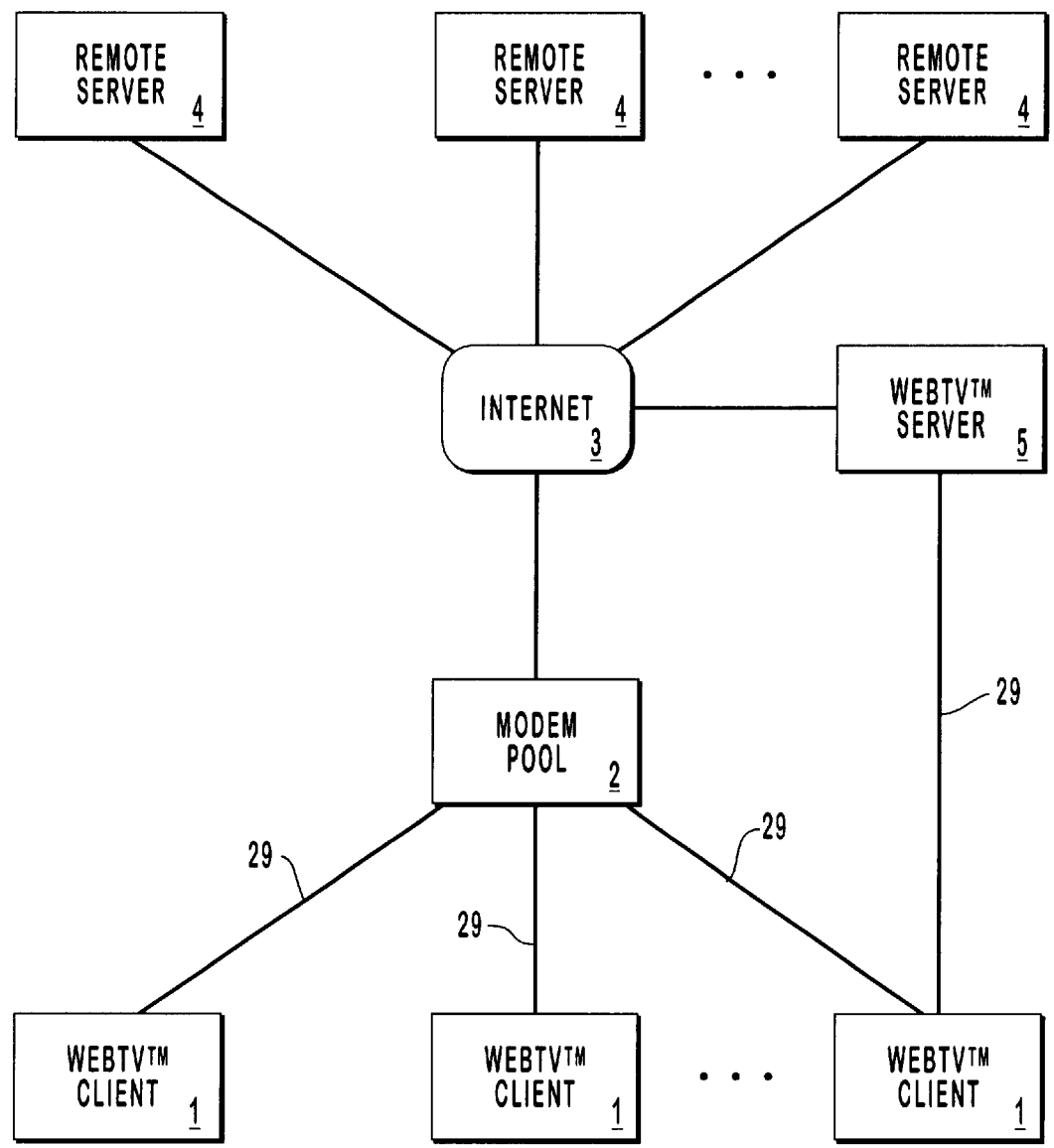
FIG. 1A illustrates several WebTV client systems connected to a WebTV server system.

FIG. 1A illustrates a configuration of a WebTV network according to one embodiment. A number of WebTV clients 1 are coupled to a modem pool 2 via direct-dial, bi-directional data connections 29, which may be telephone (POTS, i.e., "plain old telephone service"), ISDN (Integrated Services Digital Network), or any other similar type of connection. The modem pool 2 is coupled typically through a router, such as that conventionally known in the art, to a number of remote servers 4 via a conventional network infrastructure 3, such as the Internet. The WebTV system also includes a WebTV server 5, which specifically supports the WebTV clients 1. That is, the server 5 provides the WebTV services to the WebTV clients 1. Each of the clients 1 can connect to the server 5 either through direct telephone or ISDN connection or through the Internet 3 via the modem pool 2. Note that the modem pool 2 is a conventional modem pool, such as those found today throughout the world providing access to the Internet and private networks. Modem pool 2 may be provided by a local Internet Service Provider (ISP).

The WebTV server 5 generally includes one or more conventional computer systems. The server 5 may actually comprise multiple physical and logical devices connected in a distributed architecture.

Figure 1B:
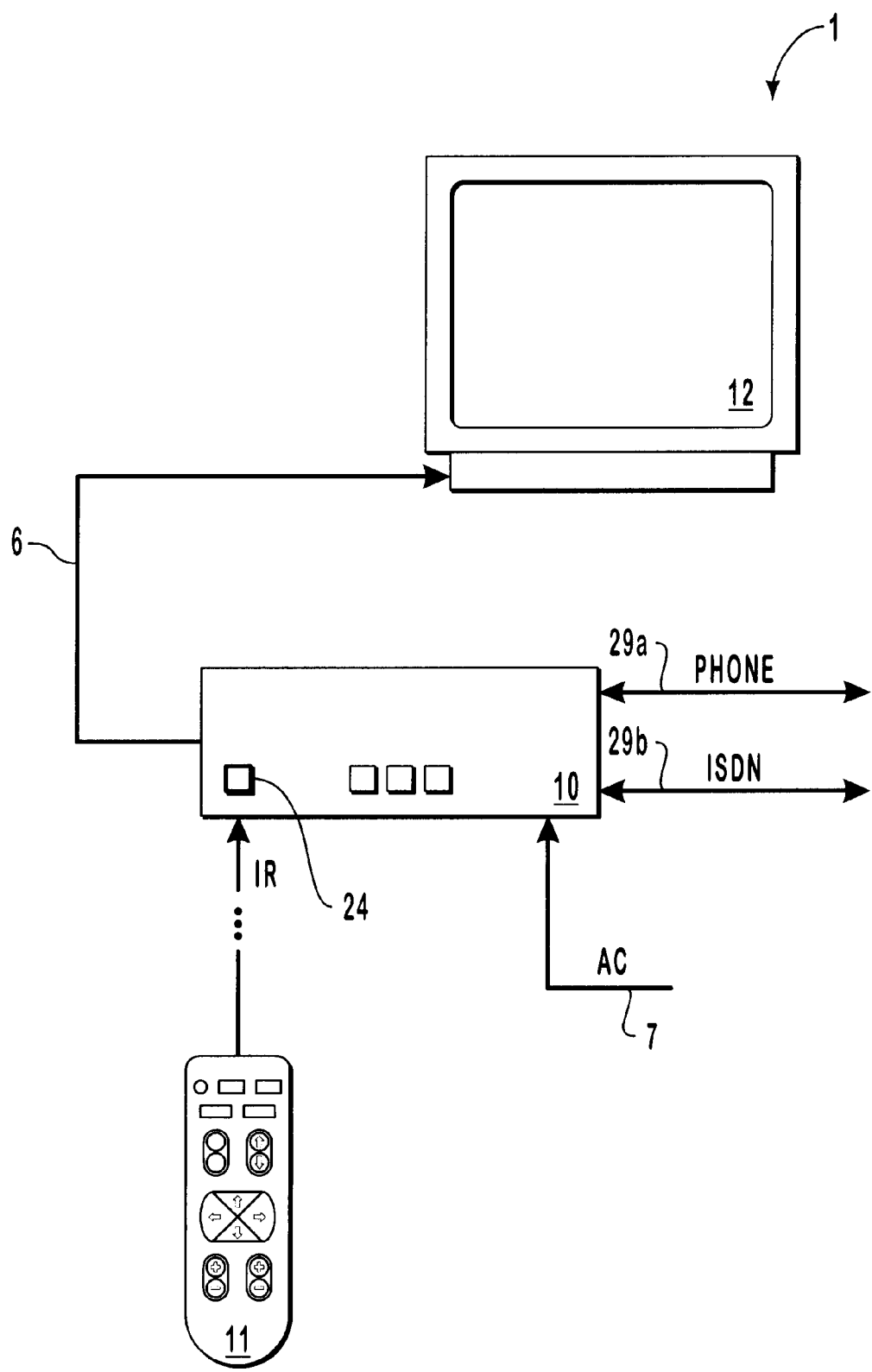
FIG. 1B illustrates a WebTV client system.

FIG. 1B illustrates a WebTV client system 1 according to one embodiment. The client system 1 includes an electronics unit 10 (hereinafter referred to as "the WebTV box 10" or "the box 10"), an ordinary television set 12, and a hand-held remote control 11. In an alternative embodiment of the present invention, the WebTV box 10 is built into the television set 12 as an integral unit. The box 10 includes hardware and software for providing the user with a graphical user interface, by which the user can access the WebTV network services, browse the Web, send e-mail, and otherwise access the Internet.

The client system 1 uses the television set 12 as a display device and an audio output device. The box 10 is coupled to the television set 12 by a link 6. The link 6 includes an audio channel for generating sound from the television's speaker and an RF (radio frequency), S-video, composite video, or other equivalent form of video channel. The communication link 29 between the box 10 and the server 5 is either a telephone (POTS) connection 29a or an ISDN connection 29b. The box 10 receives AC (alternating current) power through an AC power line 7. Remote control 11 is operated by the user in order to control the client system 1 to browse the Web, send e-mail, and perform other Internet-related functions. The box 10 receives commands from remote control 11 via an infrared (IR) communication link. In alternative embodiments, the link between the remote control 11 and the box 10 may be RF or any equivalent mode of transmission. The box 10 includes application software which, when executed by a processor in the box 10, provides the user with a graphical user interface by which the user can access the WebTV network services and browse the Web. The application software is automatically executed upon application of power to the box 10.

Figure 1C:
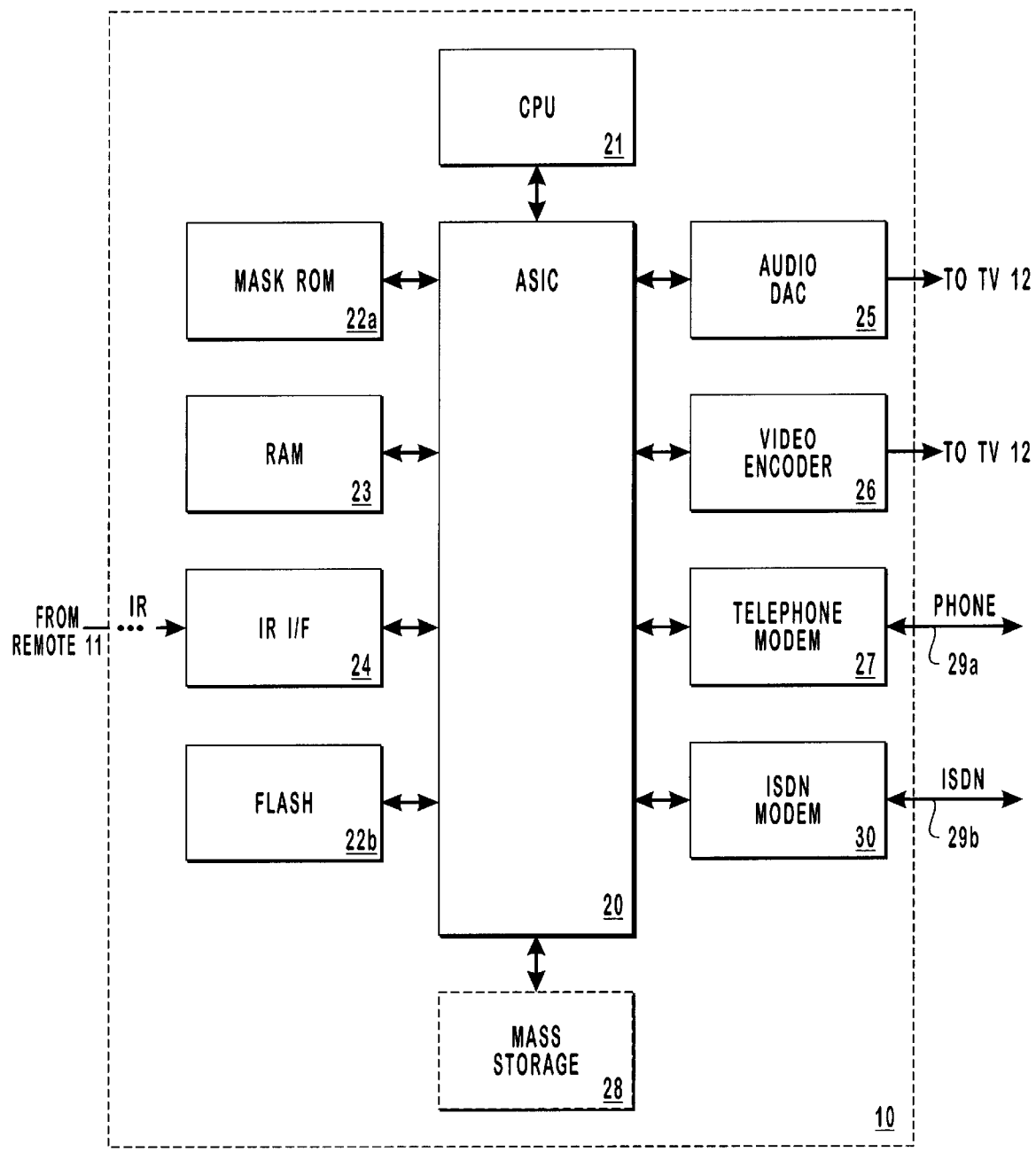
FIG. 1C is a block diagram of an electronics unit of a WebTV client system.

FIG. 1C shows the internal components of the box 10. Operation of the client system 1 is controlled by a CPU 21, which is coupled to an Application-Specific Integrated Circuit (ASIC) 20. The CPU 21 executes software designed to implement features of the present invention. ASIC 20 contains circuitry which is used to implement certain functions of the WebTV system. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that, while the illustrated embodiment includes both a telephone modem 27 and an ISDN modem 30, either one of these devices will suffice to practice the present invention. Further, in various other embodiments, the telephone modem 27 and the ISDN modem 30 each may be replaced by or supplemented with other communications devices, such as a cable television modem. In addition, in other embodiments, communication with the server 5 might be made via a token ring or Ethernet connection. Note that the box 10 also may include a cable television modem (not shown).

Also coupled to ASIC 20 is mask Read-Only Memory (ROM) 22a, a flash memory 22b, and a Random Access Memory (RAM) 23. Mask ROM 22a (which is so named because it is non-programmable) provides storage of certain program instructions and data, as will be described below. Flash memory 22b is a conventional flash memory device that can be written to (programmed) and erased electronically. Flash memory 22b provides storage of the browser software as well as data. In one embodiment, a mass storage device 28 is included in the box 10 and coupled to ASIC 20. The mass storage device 28 may be used to input software or data to the client or to download software of data received over network connection 29. The mass storage device 28 includes any suitable medium for storing machine-executable instructions, such as magnetic disks, optical disks, and the like.

Figure 2A:
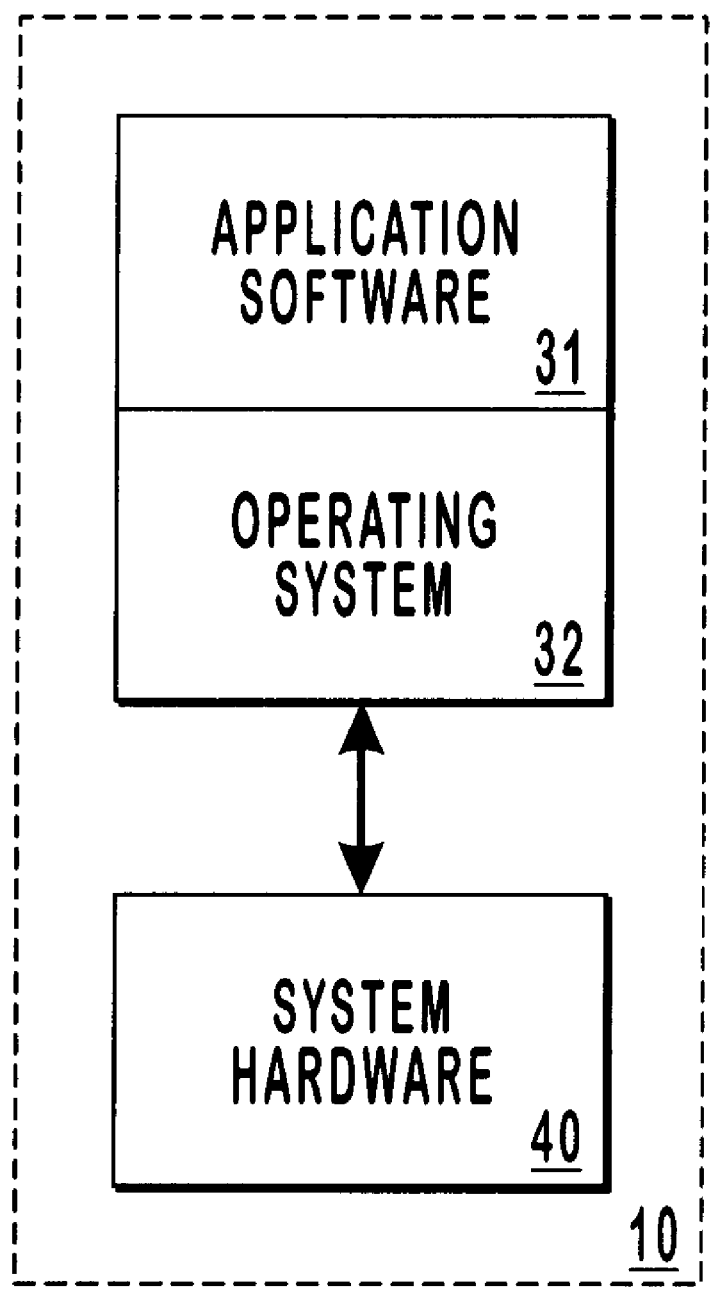
FIG. 2A illustrates the functional relationship between hardware and software in the client processing system of FIG. 1.

As mentioned above, the WebTV box 10 includes application software including a Web browser. Referring now to FIG. 2A, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 1C).

In one embodiment, the application software 31 and the OS software 32 are stored in flash memory 22b. It will be recognized, however, that some or all of either the application software 31 or the OS software 32 or both can be stored in any other suitable storage medium, such as mask ROM 22a or mass storage device 28, in various embodiments.

As mentioned above, steps according to the present invention are embodied in machine-executable instructions according to one embodiment. For example, in one embodiment the present invention is carried out by the CPU 21 executing sequences of instructions contained in mask ROM 22a, flash memory 22b, or RAM 23, or a combination of these devices. More specifically, execution of the sequences of instructions causes the CPU 21 to perform the steps of the present invention. These steps will be described below. Instructions for carrying out the present invention may be loaded into memory from a persistent store, such as mass storage device 28, and/or from one or more other computer systems over a network, such as the WebTV server 5 or a remote server 4. For example, such a server system may transmit a sequence of instructions to the client system 1 in response to a message transmitted to the server system over the Internet 3 by the client system 1. As the client system 1 receives the instructions via a network connection, such as modem 27a, the client system 1 stores the instructions in a memory. The client system 1 may store the instructions for later execution or execute the instructions as they arrive over the network connection.

In some embodiments, the downloaded instructions may be directly supported by the CPU 21. Consequently, execution of the instructions may be performed directly by the CPU 21. In other embodiments, the instructions may not be directly executable by the CPU 21. Under these circumstances, the instructions may be executed by causing the CPU 21 to execute an interpreter that interprets the instructions, or by causing the CPU 21 to execute instructions which convert the received instructions into instructions that can be directly executed by the CPU 21.

Certain embodiments and aspects of the present invention may be also carried out in the WebTV server 5, instead of (or in addition to) being carried out in the WebTV client system 1. For example, a CPU of the server 5 may execute instructions stored in memory to perform steps in accordance with the present invention.

In various embodiments, hardwired circuitry may be used in place of, or in combination with, software instructions to implement the present invention. Thus, the present invention is not limited to any specific combination of hardware circuitry and software, nor to any particular source for the instructions executed by a computer system.

Figure 2B:
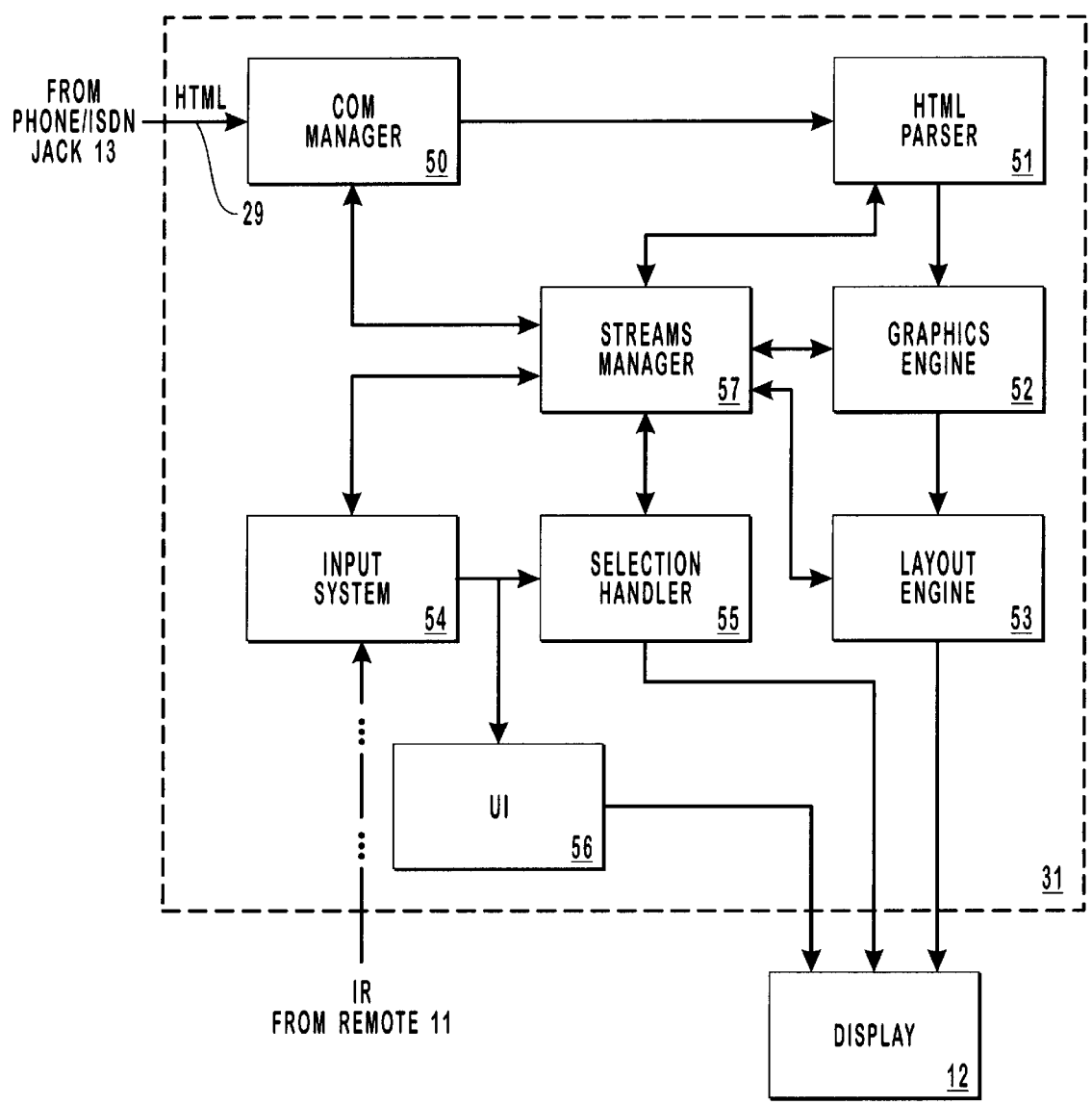
FIG. 2B is a block diagram of the Web browser application software of FIG. 2B.

The Web browser functions of the present invention are implemented by application software 31. FIG. 2B illustrates the functional relationships between the various components of application software 31. Application software 31 includes a communications manager 50, an HTML (Hypertext Markup Language) parser 51, a graphics engine 52, a layout engine 53, an input system 54, a user interface 56, a selection handler 55, and a streams manager 57. The client system receives Web pages over network connection 29 in the form of HTML documents. Streams manager 57 controls and coordinates movement of data throughout the system.

Each HTML document is initially input to communications manager 50. Communications manager 50 performs functions necessary to receive an HTML document, over the network connection 29 including handling high-level communications protocols, such as HTTP (Hypertext Transport Protocol), TCP/IP (Transmission Control Protocol/Internet Protocol), etc. A received HTML document is provided by communications manager 50 to HTML parser 51. HTML parser 51 converts HTML page descriptions to a displayable format for the client system.

As is well known, an HTML document may contain text and/or refer to images and other media types. Further, an HTML document may include one or more "hypertext anchors," which are displayable objects that provide a link to another Web page. Hypertext anchors are also sometimes referred to as "hot links" or "hot spots." Each hypertext anchor is associated with a particular URL (Uniform Resource Locator) or other logical address representing the location of the Web page to which the anchor provides a link. The URL may or may not be stored within the client system, as will be discussed below. A hypertext anchor may be a word or a phrase of text, an image, or a part of an image. The hypertext anchors and other objects which are to be displayed on a screen are defined in the HTML document by a number of "tags" which specify information relating to the displayable object and its attributes (e.g., whether the object is a hypertext anchor, an image map, an image map containing hypertext anchors, etc.). Accordingly, HTML parser 51 separates tags from text within each HTML document under the control of the streams manager 57.

HTML parser 51 also generates a list of "displayables" (displayable objects) from the received HTML document. In addition, the HTML parser 51 generates a sorted list of "selectables" (selectable objects, i.e., displayable objects which are hypertext anchors). The method of generating this sorted list is discussed below in greater detail. The data structure containing the list of displayables is provided by HTML parser 51 to layout engine 53, which places the displayable objects on the screen of the television set 12. Image information, such as JPEG or GIF image information, are provided by HTML parser 51 to layout engine 53 via a graphics engine 52, which is responsible for measuring and drawing images.

In the course of browsing through a displayed Web page or between different Web pages, a user activates buttons on remote control 11, which, in response, transmits IR signals that are received by the box 10. Input system 54 records these inputs and provides them to selection handler 55 and user interface 56. In addition, input system 54 can handle input queuing and processing of inputs from various other input devices, such as a standard or IR keyboard. Selection handler 55 receives commands provided by the user for moving a selection (of a hypertext anchor) around on the screen (i.e., moving a selection from one hypertext anchor, to another). The selection handler 55 determines, in response to the user inputs, which of the hypertext anchors in a Web page should be a current selection and provides a selection indication to the user of the current selection through the display of television set 12. Other aspects of the Web browser which are visible to the user are provided by user interface 56 based on signals received from input system 54.

Figure 3:
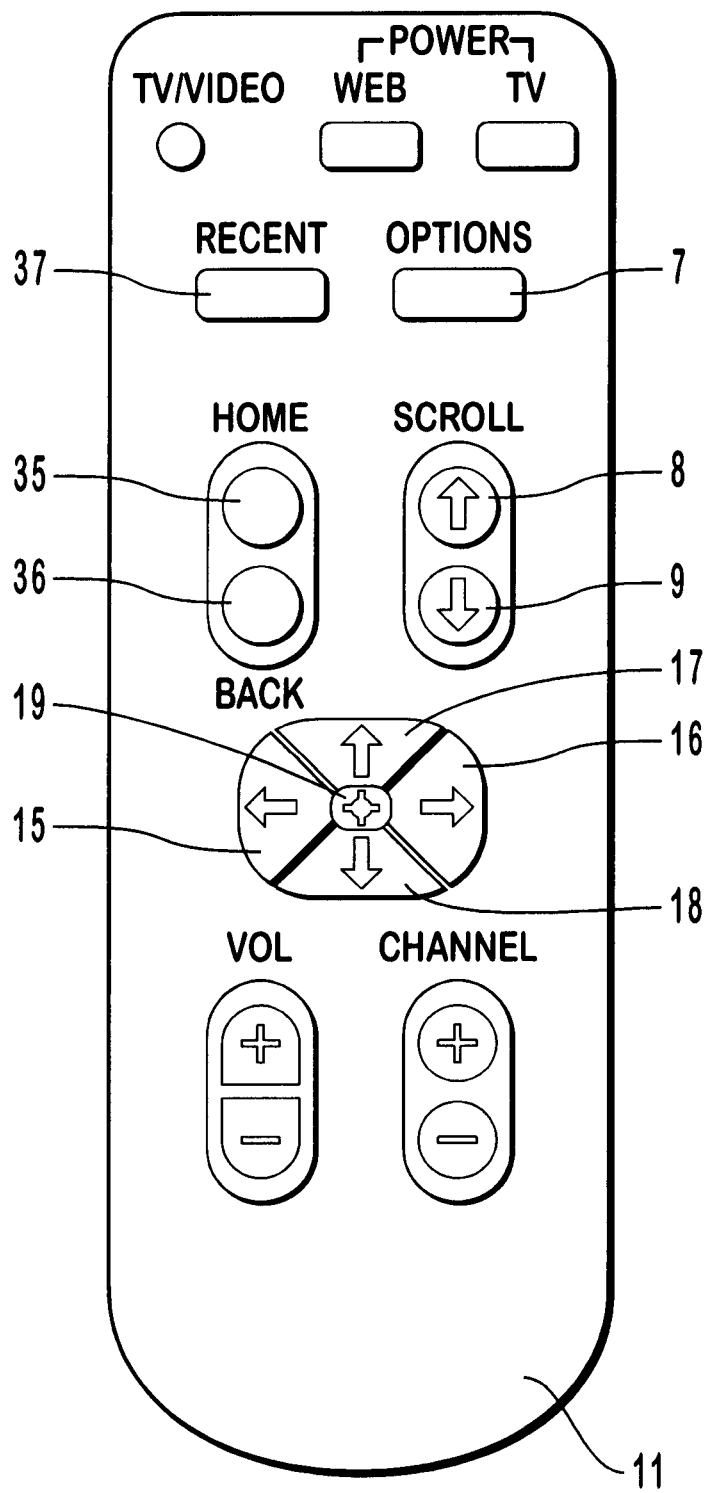
FIG. 3 illustrates a remote control for controlling the Web browser.

FIG. 3 illustrates remote control 11 in greater detail. In the preferred embodiment, remote control 11 is similar to, and has the general appearance of, a common, hand-held remote control that is used to control a television set. In fact, remote control 11 may include controls for performing any or all of the user-controlled functions of television set 12. In an alternative embodiment, remote control 11 may be a wired hand-held controller or a wired or wireless (e.g., IR) keyboard or any other similar device. Remote control 11 includes Options button 7, Scroll Up button 8, Scroll Down button 9, direction buttons 15–18, Enter button 19, Home button 35, Back button 36, and Recent button 37. Direction buttons 15–18 include left button 15, right button 16, up button 17, and down button 18.

The functions of the controls on remote control 11 will be described below in detail. However, a summary of certain ones of these functions is helpful at this point. Home button 35 causes the client system 1 to directly access and display the Home page of the WebTV network services. Back button 36 allows the user to retrace his steps by revisiting previously-visited Web pages in reverse chronological order. Recent button 37 is used to access a display indicating the most recent Web sites (pages) the user has visited. From this display, the user will be allowed to directly revisit any of those sites. Scroll Up button 8 and Scroll Down button 9 are used to scroll the screen up or down, respectively, to display a previously undisplayed portion of a Web page. Direction buttons 15–18 allow the user to specify a direction of movement in order to select a new hypertext anchor. When Enter button 19 is pressed, remote control 11 sends a command to the box 10 to activate the hypertext link corresponding to the currently selected hypertext anchor. That is, in response to Enter button 19 being pressed, the uniform resource locator (URL) or other logical address of the currently selected hypertext object is transmitted by the box 10 over the network connection 29 (except in the case of certain image maps, as will be described below) in order to access the corresponding Web page.

II. Hotlink Navigation

Figure 4A:
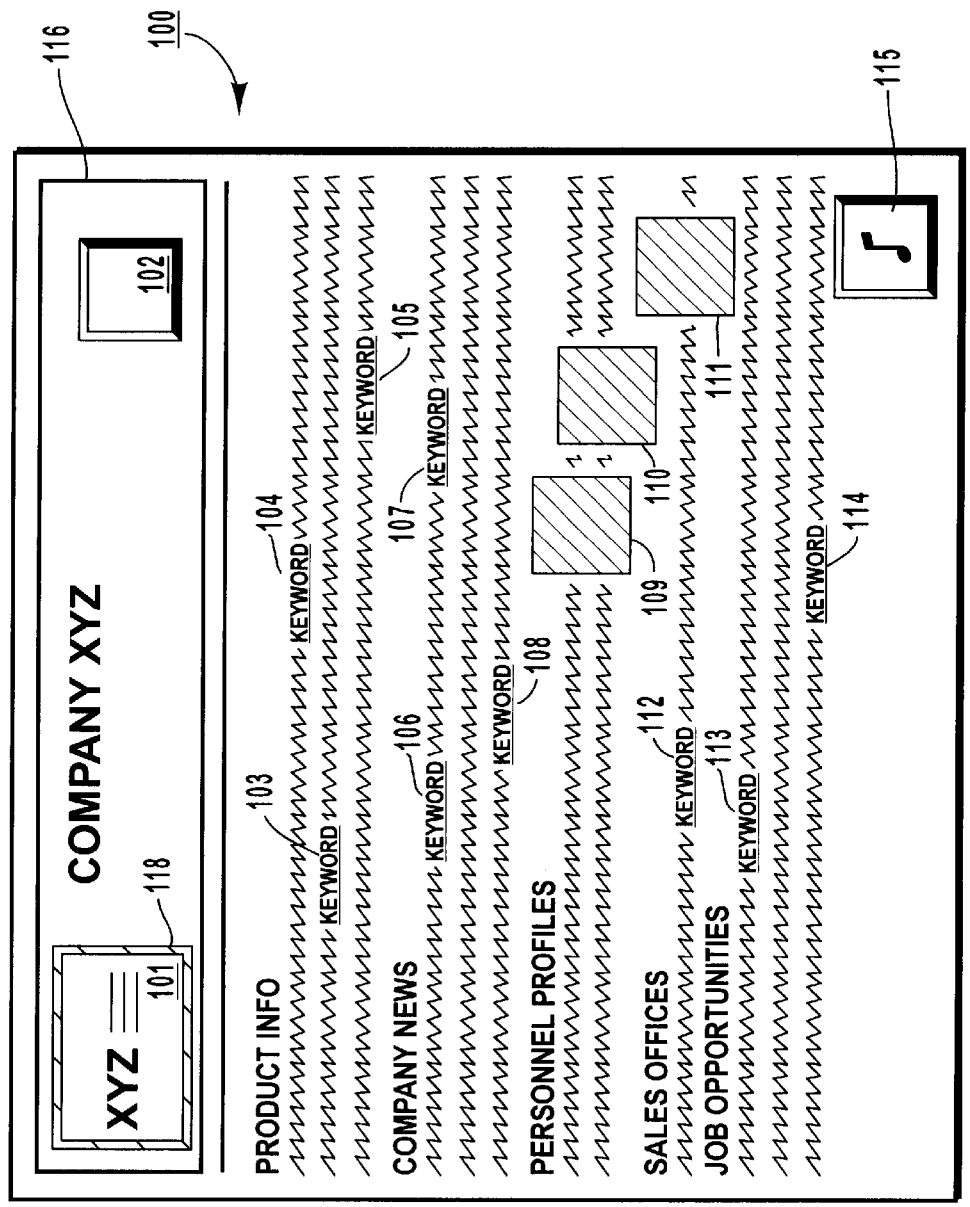
FIGS. 4A and 4B illustrate a displayed Web page containing a number of hypertext anchors.

FIG. 4A illustrates an example of a Web page 100 which may be displayed by television 12 using the client system.

Web page 100 is a sample home page for a fictitious company, Company XYZ. Web page 100 includes a number of hypertext anchors 101–115, each of which provides a link to another Web page that is not currently displayed. In Web page 100, hypertext anchors 101, 102, 109, 110, 111, and 115 are image maps. Hypertext anchors 101 and 102 are included within image map 116, which is not a hypertext anchor.

Hypertext anchor 101 is the logo for Company XYZ. Logo anchor 101 may provide a link, for example, to another Web page which provides a history of company XYZ. Hypertext anchor 115 may provide a link, for example, to an audio stream which generates the jingle (theme song) of Company XYZ, and which can be output to the user through the speaker of television 12. The remainder of the Web page 100 contains informational text about Company XYZ grouped under the headings: "Product Information," "Company News," "Personnel Profiles," "Sales Offices," and "Job Opportunities." Hypertext anchors 103–108 and 112–114 are key words or phrases within the text.

The application software 31 provides means for the user to navigate between the hypertext anchors displayed on a Web page, such as Web page 100, using the remote control 11. In particular, application software 31, in response to user inputs from remote control 11, moves a selection from one hypertext object to another in a discrete movement. At a given point in time, only one displayed hypertext object is selected and is displayed as a current selection. In FIG. 4A, for example, hypertext anchor 101 is selected and is indicated as the current selection by highlighting 118. Once a hypertext anchor is selected, the user can activate its link to another Web page by pressing "Enter" button 19. To change the current selection, the user specifies a direction in which he wishes to "move" the selection by pressing any of direction buttons 15–18 on remote control 11. In response to one of these inputs, the application software 31 determines which of the other hypertext objects in the HTML document, if any, to select and display as the new current selection. In prior systems, the user is required to move a pixel-accurate cursor over the screen in continuous movements and to determine when the cursor coincides with a hypertext anchor. In contrast, the present invention determines the location of all hypertext objects and selects a new hypertext anchor based on the inputs received from remote control 11. The user is not required to locate hypertext objects.

Figure 4B:
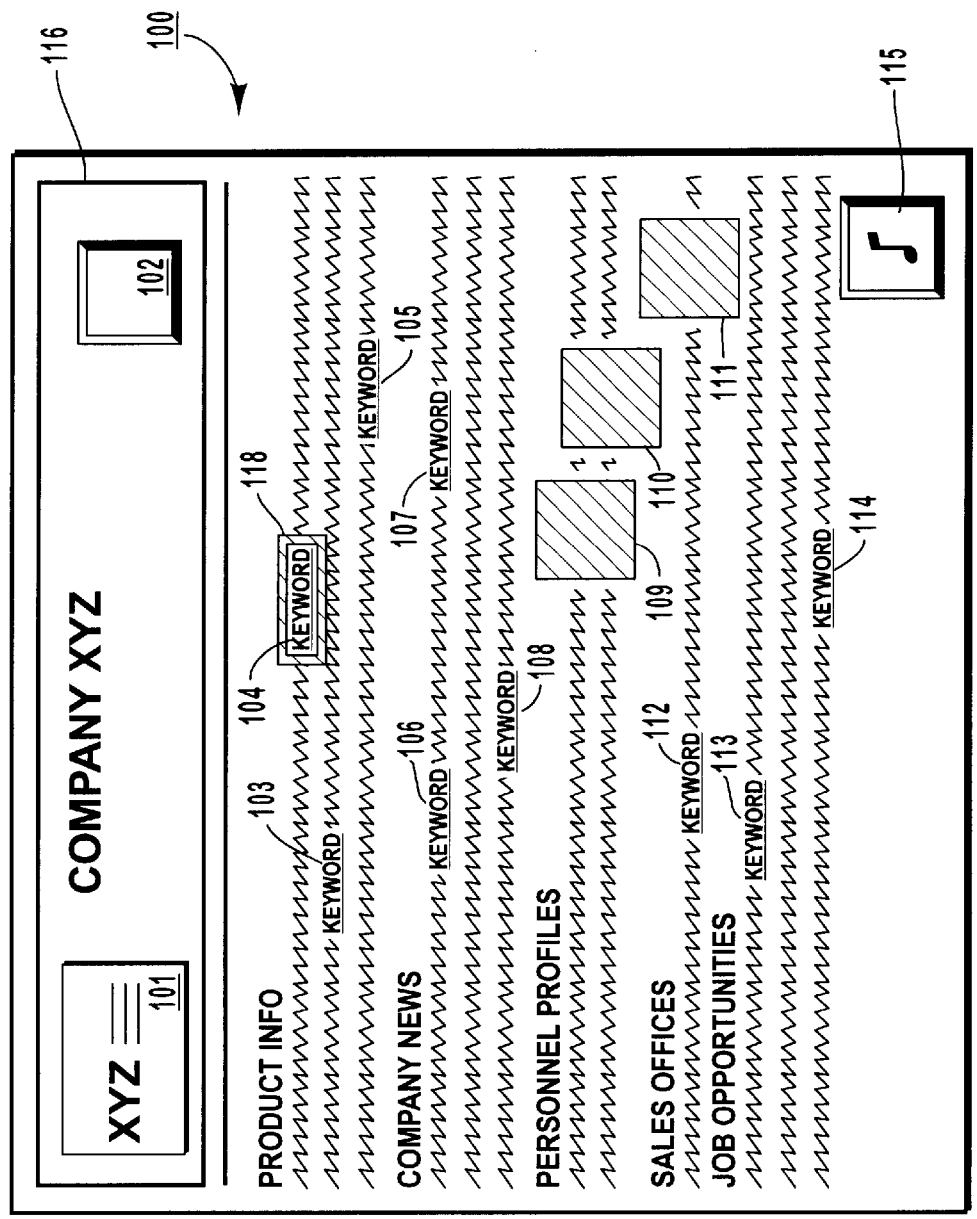

Assume now that the user wishes to change the current selection, hypertext anchor 101, to a new hypertext anchor—anchor 104, for example. The present invention allows the user to do this by pressing one of direction buttons 15–19 on remote control 11. FIG. 4B illustrates the Web page 100 as displayed with the anchor 104 as the current selection, as indicated by highlighting 118. Using remote control 11, the user may move the current selection successively through all of the displayed hypertext anchors and may also access and select hypertext anchors in the current HTML document which are not currently displayed by scrolling the document.

Figure 5:
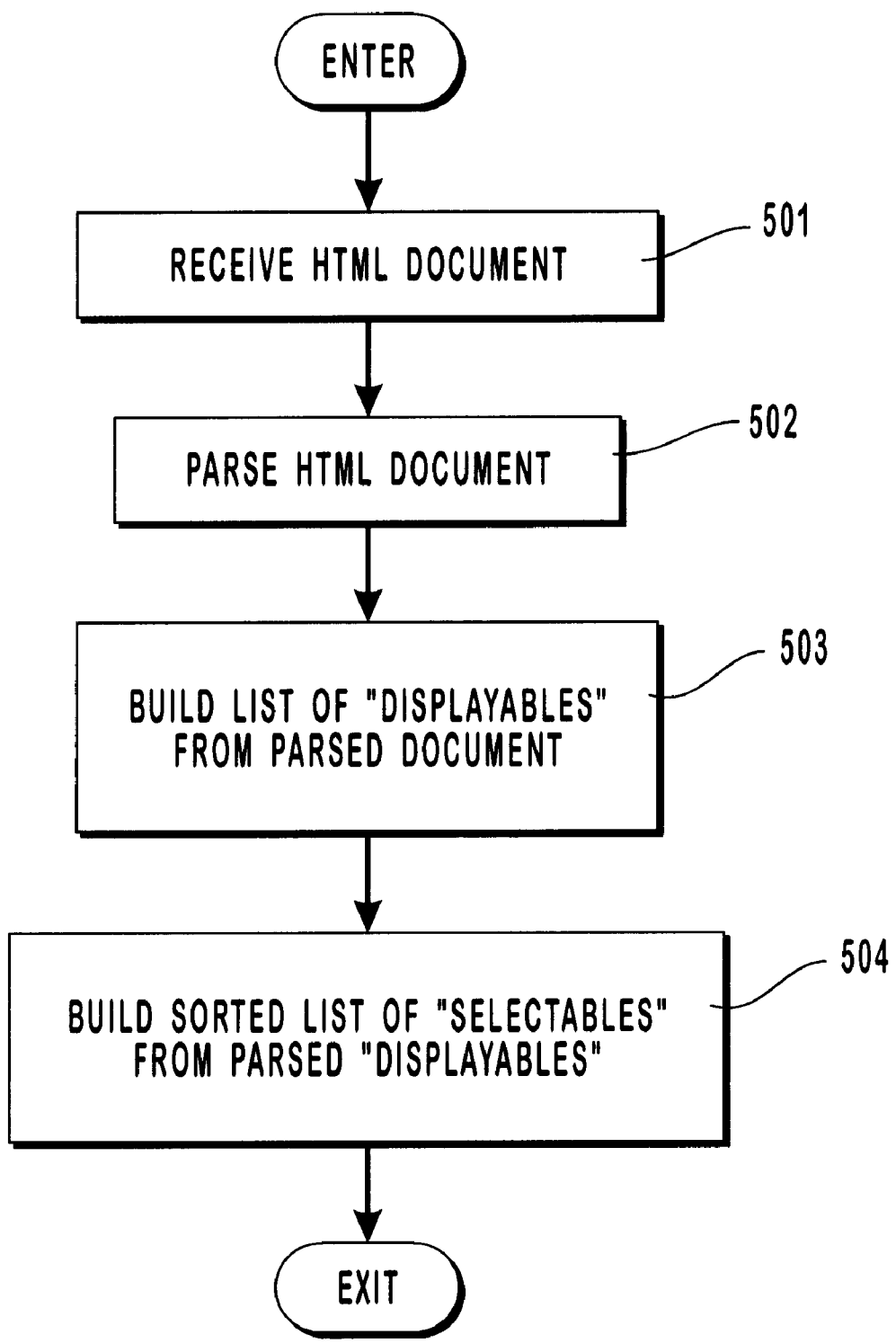
FIG. 5 is a flow diagram illustrating a procedure for receiving and processing of an HTML document according to the present invention.

FIG. 5 illustrates a routine for setting up a data structure performed by the application software 31 in order to permit the functions just described. Initially, an HTML document is received via the network connection 29 (step 501). Next, the HTML document is parsed into text and tags (step 502). From the parsed HTML document, a list is generated of the displayables in the current HTML document (step 503). Displayables may include either text or images. Methods of identifying displayables in an HTML document are well known and need not be discussed herein. From the list of displayables, a sorted list of selectables (e.g., hypertext anchors) is generated (step 504).

The list of selectables is sorted as it is generated according to an insertion sort routine. The selectables are sorted according to their positioning on the Web page, as it is to be displayed. More specifically, the list of selectables is formed according to the direction of reading or writing in the English language (i.e., left to right, top to bottom). Sorting is performed first according to vertical position, and then according to horizontal position. Accordingly, a selectable would be inserted into the selectable list at a position before any selectables which it appears higher than on the Web page; a selectable would also be inserted into the selectable list at a position before any selectables that it appears to the left of on the Web page but have the same vertical position.

In performing the insertion sort to generate the list of selectables, the determination of vertical positioning requires a determination of whether a given selectable falls "above" or "below" an existing entry in a selectable list. This determination can be complicated by the fact that there is often overlap in the vertical direction between two selectables. In FIGS. 4A and 4B, for example, there is vertical overlap between anchors 109 and 110. The present invention resolves this difficulty in the following way: If there is overlap between a given selectable and another selectable, then the given selectable is considered to be "below" the other selectable if the overlap between the two selectables is less than one-half of the height of the smaller of the two selectables and the top of the given selectable is below the top of the other selectable. If the overlap is not less than one-half of the height of the smaller of the two selectables or if the top of the given selectable is not below the top of the other selectable, then the given selectable is not considered to be "below" the other selectable. This same criterion is applied to determine when a given selectable can be considered "above" another selectable. Further, this method of defining the conditions "above" and "below" is also used in moving the current selection in response to a user input, as will be discussed below.

Referring now to FIGS. 4A and 4B for example, the sorted list of selectables generated from Web page 100 would have the following order (listed by reference numeral): 101, 102, 104, 103, 105, 106, 107, 108, 109, 110, 112, 111, 113, 114, 115. It should be appreciated that in the actual implementation, the sorted list of selectables may actually constitute a list of pointers to entries in the list of displayables. Note that in reading Web page 100 from top to bottom (in English), a person would encounter anchor 104 before encountering anchor 103, since anchor 104 is in a line of text that is above the line of text including anchor 103. Consequently, anchor 104 appears before anchor 103 in the sorted list of selectables. Note further that anchor 112 appears before anchor 111 in the sorted list of selectables; this is so because there is overlap in the vertical direction between these two anchors, and the amount of overlap includes the entire height of anchor 112. Consequently, anchors 111 and 112 are considered to have the same vertical rank on Web page 100. However, since anchor 112 appears to the left of anchor 111, anchor 112 is inserted into the sorted list before anchor 111.

Figure 6:
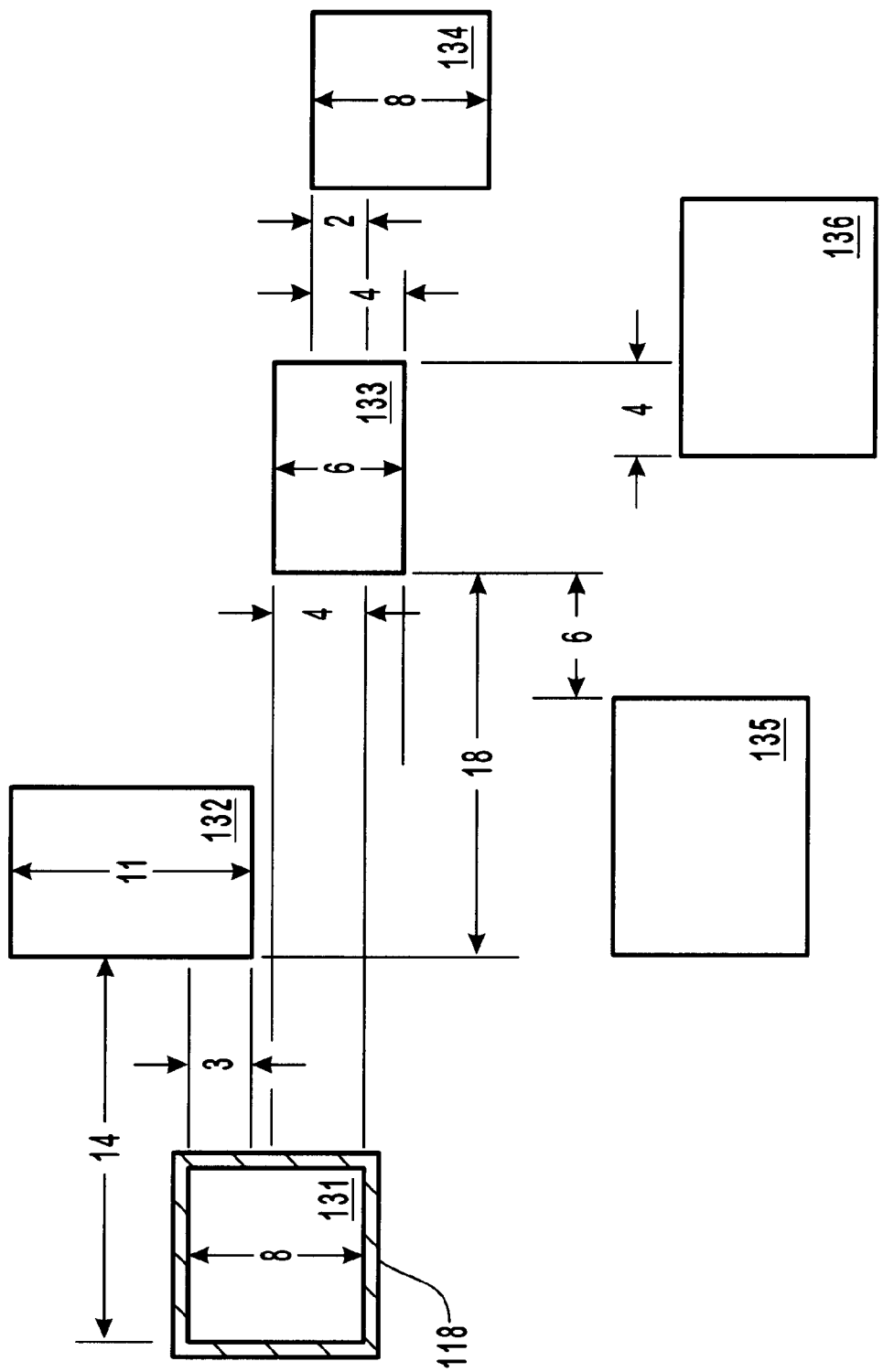
FIG. 6 illustrates several hypertext anchors as displayed on a display device.

The method of moving a selection between hypertext anchors using remote control 11 will now be described with reference to FIGS. 6, 7A, and 7B. As mentioned above, a user may move the current selection left or right by one hypertext anchor by pressing left button 15 or right button 16, respectively. In response to receiving an IR signal corresponding to either button 15 or button 16, the software 31 of the present invention (specifically, selection handler 55) simply moves one position through the sorted list to determine the new current selection. That is, if left button 15 was pressed, the new current selection will be one position higher in the sorted list from the current selection, whereas, if right button 16 was pressed, the new current selection will be one position lower in the sorted list from the current selection. In response to any of direction buttons 15–18 being pressed, a new current selection will be determined and the highlighting 118 will be moved to indicate the new current selection. The screen may be scrolled to display the current selection, as discussed below. As mentioned above, the user may activate the hypertext link of the current selection by pressing "Enter" button 19. Movement of the current selection in response to down button 18 being pressed will now be described with reference to FIG. 7A. When down button 18 is pressed, each entry (selectable) that appears in the sorted list after the current selection is examined according to the following routine to determine whether it is a Best Guess. The Best Guess is a selectable which is, at least temporarily, considered to be the most likely selectable to be the new current selection based on the last user input. As each entry in the list is tested, whichever entry is currently considered to be the Best Guess may then be replaced by the selectable being tested if the selectable being tested is determined to be a better choice. Once the end of the list is reached, the selectable that is designated as the Best Guess will be taken to be the new current selection. Accordingly, highlighting 118 will be moved to indicate the new current selection to the user. In response to the down button 18 being pressed, the application software 31 initially determines which selectable in the sorted list of selectables is the next selectable after the current selectable (i.e., after the current selection) (step 701); the result of this determination will be referred to herein as "selectable_I". Next, the determination is made of whether selectable_I is currently displayed on the screen (step 702). If not, then the screen is scrolled down by a predetermined number of pixels, but less than an entire screen (step 714). An exemplary number of pixels is 100, although that number is essentially arbitrary. After the screen is scrolled down by the predetermined number of pixels, another determination is made of whether selectable_I is displayed on the screen (step 715). If the selectable_I is still not displayed on the screen, then the current selection is not changed, and the highlighting 118 is not moved (step 713). Note that if the current selection is no longer visible after the scroll, no selection is displayed.

If, however, after scrolling down by the predetermined number of pixels (step 714), selectable_I is displayed on screen, or if selectable_I was displayed initially (step 702), then a determination is next made of whether the vertical overlap between the current selection and selectable_I is less than one-half of the height of the smaller of the current selection and selectable_I (step 703). If so, a determination is made of whether the top of selectable_I is below the top of the current selection (step 704). Note that the order of these two determinations (steps 703 and 704) can be reversed, if desired. Note also that these two determinations constitute the same test used to determine the "below" condition when generating the sorted list of selectables.

If the answer to either of these two determinations is "no," then the process proceeds to a determination of whether selectable_I is the last selectable in the sorted list (step 711). If selectable_I is not the last selectable in the list, then the procedure of FIGS. 7A and 7B is repeated, taking the next selectable in the list as selectable_I (steps 718, 701). Alternatively, if selectable_I is the last selectable in the list, then the new current selection is taken to be whichever selectable is currently designated as the Best Guess, as explained below (step 712).

If (in step 703) the vertical overlap between the current selection and selectable_I is less than one-half of the height of the smaller of the current selection and selectable_I, and (in step 704) the top of selectable_I is below the top of the current selection (step 704), then it is next determined whether there is currently a Best Guess (step 705). If there is not yet a Best Guess, then the Best Guess is taken to be selectable_I (step 710). Again, if selectable_I is not the last selectable in the list, then the process repeats from the beginning with the next entry in the list. If (in step 705) there was already a Best Guess, then a determination is made of whether the top edge of selectable_I has a higher vertical position (smaller "Y" coordinate) than the bottom edge of the Best Guess selectable (step 706). If not, then selectable_I is disregarded as a potential new Best Guess, since it is lower on the screen than the current Best Guess. The reason for disregarding selectable_I in this case is an assumption that the user would not wish to jump from the current selection to selectable_I if there is another selectable that is below the current selection but above selectable_I. Accordingly, in that situation a determination is again made as to whether selectable_I is the last selectable in the list (step 711). If not, the process repeats from the beginning (steps 718, 701) using the next entry in the list.

If (in step 706) the top of selectable_I is higher than the bottom of the Best Guess, then it is determined how much overlap, Guess Overlap, exists (if any) between the Best Guess and the current selection (step 707) in the horizontal direction. Similarly, a determination is made of how much horizontal overlap, Selectable Overlap, exists (if any) between selectable_I and the current selection (step 708). If Guess Overlap is less than Selectable Overlap (step 709), then the Best Guess is replaced by selectable_I (step 710); that is, selectable_I is then considered to be the new Best Guess. Accordingly, the process repeats using the next entry in the sorted list of selectables, assuming selectable_I was not the last selectable on the list.

If (in step 709) Guess Overlap is not less than Selectable Overlap, then two situations might exist. The first situation is that the overlap amounts are equal (i.e., Guess Overlap= Selectable Overlap). The second is that Selectable Overlap is greater than Guess Overlap. Generally, the amount of horizontal overlap will be equal when Guess Overlap and Selectable Overlap are both zero (i.e., when neither selectable_I nor the Best Guess overlaps the current selection horizontally). If Guess Overlap and Selectable Overlap are equal, then selectable_I is taken to be the new Best Guess (in step 710) only if the left edge of the Best Guess is farther from the left edge of the current selection than the left edge of selectable_I is from the left edge of the current selection (step 717). Otherwise, the process repeats using the next selectable in the list.

If Guess Overlap is not less than Selectable Overlap and either: (1) the Guess Overlap does not equal Selectable Overlap, or (2) the left edge of Best Guess is closer to the left edge of the current selection than the left edge of selectable_I is to the left edge of the current selection (steps 716 and 717), then the Best Guess is retained, and the process repeats (unless selectable_I was the last selectable in the list).

Once the last selectable in the list has been tested using the process just described, then the new current selection is taken to be whichever selectable is currently the Best Guess (step 712). The new current selection is then highlighted (step 713).

The procedure of FIG. 7A will now be explained with reference to FIG. 6. FIG. 6 shows a number of hypertext anchors 131–136 and defines certain spatial relationships between those anchors. A sorted selectable list of the anchors in FIG. 6 would have the following order: 132, 131, 133, 134, 135, 136. Assume now that the current selection is anchor 131 as indicated by highlighting 118. Assume further that the user has just entered an input by pressing the down button 18 on remote control 11. In response, the application software initiates the process of examining entries in the sorted selectable list which follow selectable 131 (i.e.. beginning with selectable 133). Note that selectable 132 appears before 131 in the sorted list because it is "above" selectable 131 (according to the criteria described above) and is therefore not considered in response to the down button 18 being pressed.

Figure 7A:
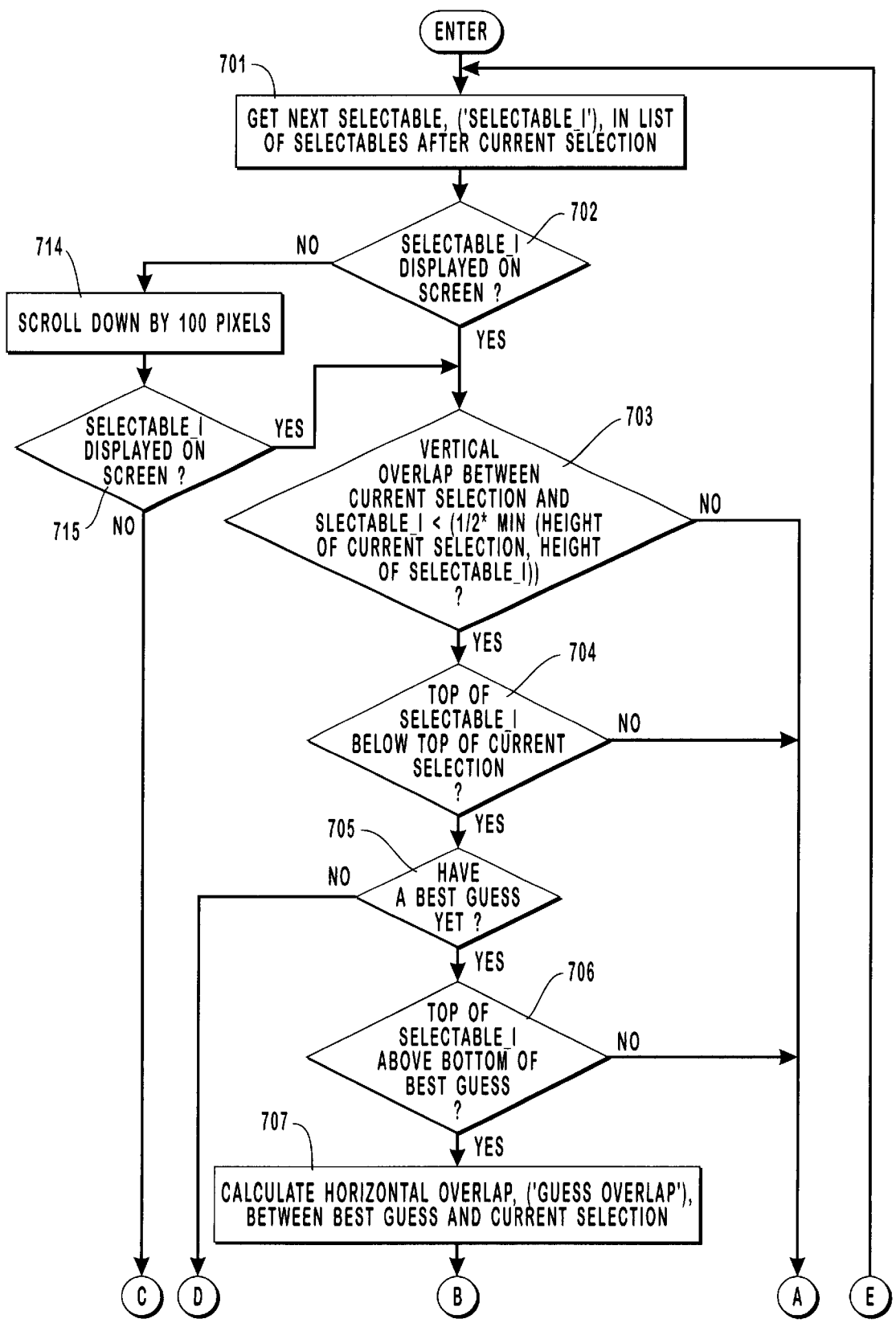
FIGS. 7A and 7B are flow diagrams illustrating the procedure of movement of a selection between two hypertext anchors in the downward direction using the remote control of FIG. 3.
Figure 7B:
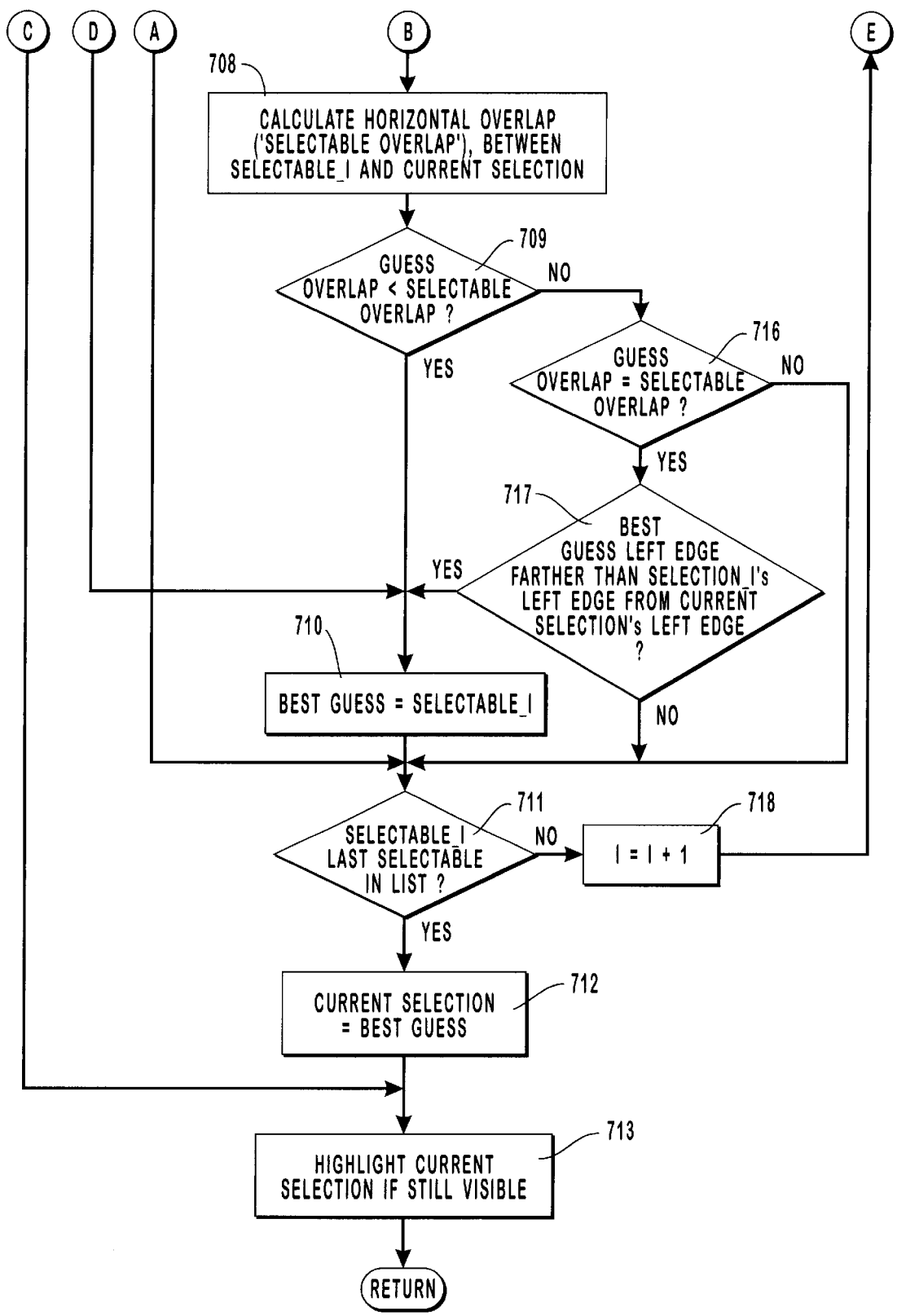

Therefore, according to the routine of FIG. 7A, the amount of vertical overlap between selectable 133 and selectable 131, if any, is determined. In this example, the amount of overlap is four units. The dimensions illustrated in FIG. 6 are provided only for purposes of illustration and can have essentially any units, such as pixels, for example. Since the amount of vertical overlap (four units) between selectable 133 and selectable 131 is greater than one-half of the height of the smaller of these two selectables (one-half of the height of selectable 133, which is %, or 3), selectable 133 is not considered to be "below" selectable 131. Consequently, since there is currently no Best Guess, selectable 133 is ignored and the next selectable in the list, selectable 134, is examined. (If there were currently a Best Guess, then that Best Guess would be retained.)

Continuing now through the sorted list of selectables, selectable 134 overlaps selectable 131 in the vertical direction by two units. Two units is less than one-half of the height of the smaller of these two selectables (which are equal in height). Further, the top edge of selectable 133 is below the top edge of selectable 131. Therefore, selectable 134 is considered to be "below" selectable 131, and selectable 134 is taken to be the new Best Guess (step 710). The next selectable to be examined is selectable 135. Selectable 135 does not overlap selectable 131 and is, therefore, considered to be below the current selection. However, the top edge of selectable 135 is below the bottom edge of the Best Guess, selectable 134. Therefore, selectable 135 is not a "better" Best Guess than the current Best Guess, selectable 134; Consequently, selectable 134 is retained as the Best Guess and the next selectable in the list, selectable 136 is examined. Essentially the same analysis applies to selectable 136 as to selectable 135.Therefore, when the end of the sorted list is reached, the Best Guess remains selectable 134. Consequently, it is determined that the new current selection is selectable 134. Accordingly, selectable 134 is highlighted to so indicate. In a different scenario, assume now that the current selection is selectable 132 and that down button 18 is pressed. The next selectable in the sorted list of selectables after selectable 132 is selectable 131. Therefore, selectable 131 is the first selectable to be examined. Selectable 131 does not overlap selectable 132 by more than four units (½ the height of selectable 131). Further, the top edge of selectable 131 is below the top edge of selectable 132. Therefore, selectable 131 is considered to be "below" selectable 132 and is taken to be the Best Guess. Moving through the sorted list, the next selectable to be examined is selectable 133. Selectable 133 meets the conditions for being "below" the current selection, selectable 132. Moreover, the top edge of selectable of 133 is not below the bottom edge of the current Best Guess, selectable 131. Therefore, selectable 133 is, so far, not eliminated from consideration. Instead, the amount of horizontal overlap is determined between selectable 133 and the current selection selectable 132 and between selectable 131 and the current selection. In this case, both selectable 131 and selectable 133 have no horizontal overlap with the current selection, selectable 132. Therefore, the next step is to determine (step 717) whether the left edge of the current selection is closer to the left edge of selectable 131 or to the left edge of selectable 133. Here, the left edge of 131 is closer. Therefore, selectable 131 is retained as the Best Guess (step 710). The above process then continues by examining the next selectable in the sorted list, selectable 134, and so forth, until the end of the sorted list is reached. At that point, the Best Guess is taken as the new current selection.

In yet another scenario, assume that the current selection is selectable 133 and that down button 18 was just pressed. Selectable 134 is the first selectable in the list to be examined. The overlap between selectable 134 and 133 is greater than one-half the height of the smaller of these two selectables (i.e., greater than 5/2, or 3). Therefore, selectable 134 is eliminated from consideration. At this point there is no Best Guess. Selectable 135 is considered next. Selectable 135 does not vertically overlap the current selection, selectable 133, and the top of selectable 135 is below the top of the current selection. Therefore, selectable 135 is taken to be the Best Guess. Next, selectable 136 is considered. Selectable 136 does not overlap the current selection, nor is the top edge of the selectable 136 below the bottom edge of selectable 135. Therefore, the horizontal overlap between the Best Guess and the current selection (Guess Overlap), and between selectable 136 and the current selection (Selectable Overlap), are determined. The Guess Overlap is zero. However, Selectable Overlap is four units. Therefore, because Selectable Overlap is greater than Guess Overlap, selectable 136 is taken to be the new Best Guess. Further, since selectable 136 is the last selectable in the sorted list, the new current selection is taken to be the current Best Guess, selectable 136.

Figure 7C:
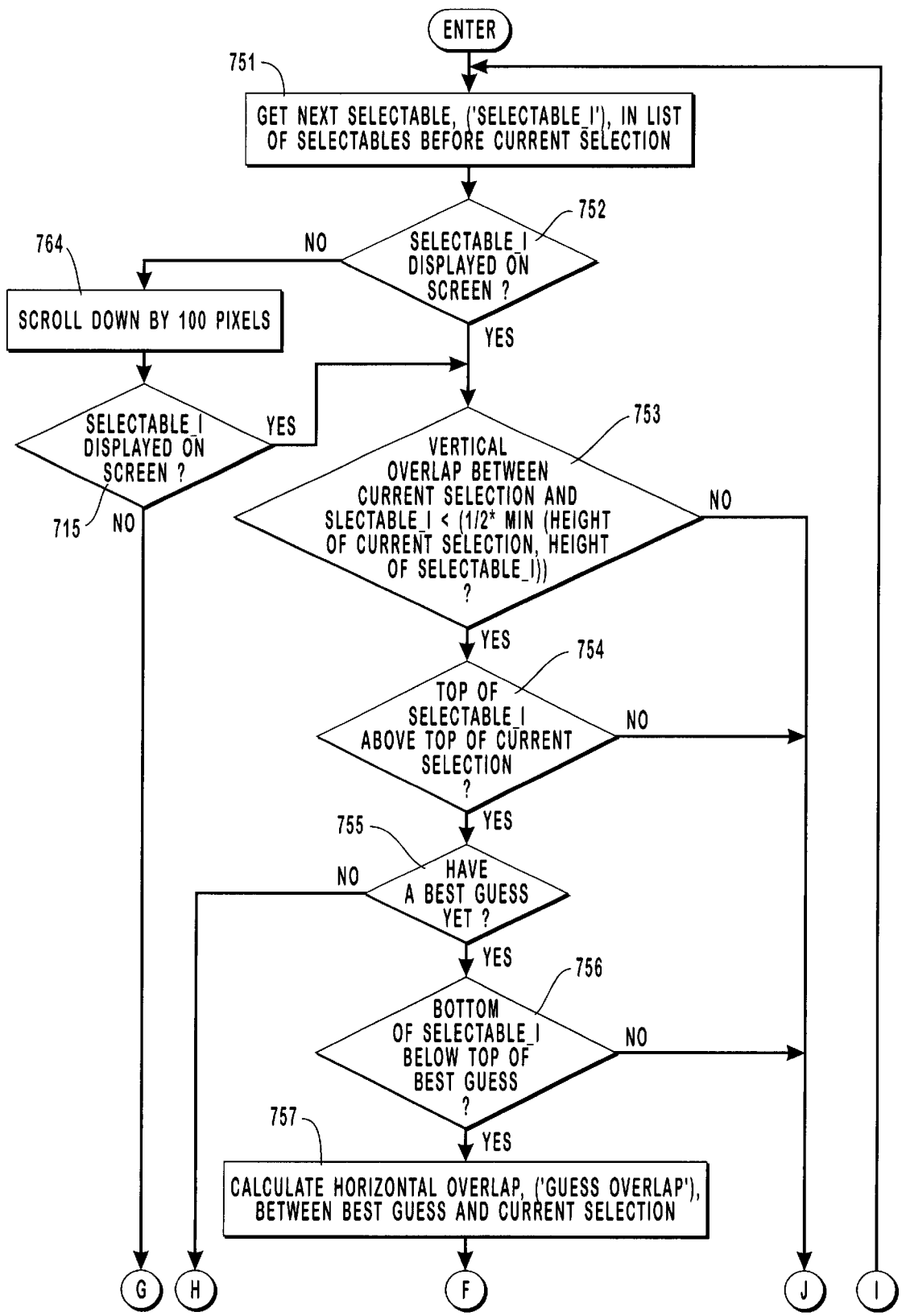
FIGS. 7C and 7D are flow diagrams illustrating the procedure of movement of a selection between two hypertext anchors in the upward direction using the remote control of FIG. 3.
Figure 7D:
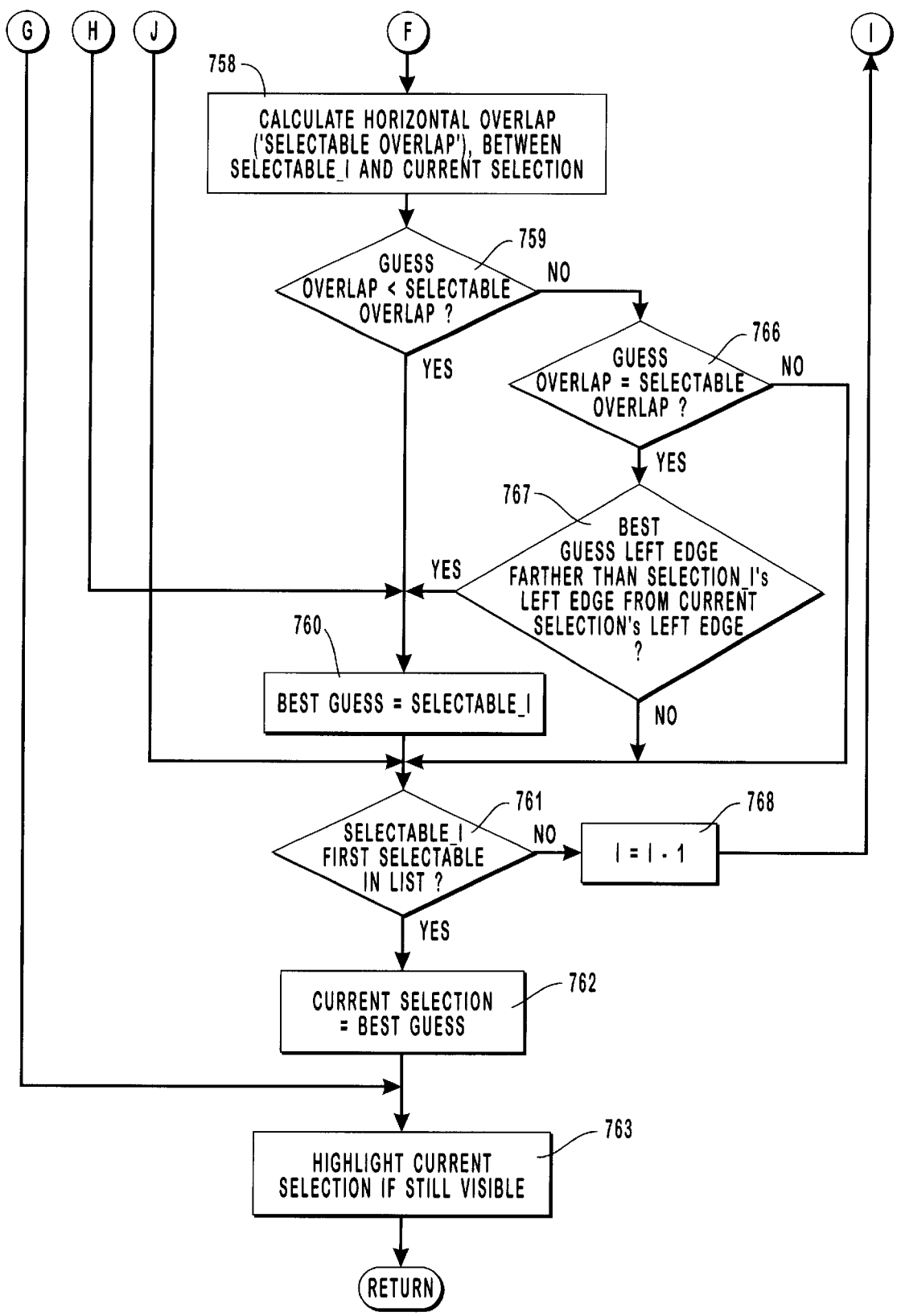

The procedure of changing the selection in response to up button 17 being pressed is illustrated in FIGS. 7C and 7D. The procedure for up button 17 is substantially identical to the procedure for down button 18 (FIGS. 7A and 7B) and therefore need be not be described on a step-by-step basis.

Nonetheless, certain differences should be noted. In response to the up button 17, in contrast with the procedure for down button 18: (1) entries in the list of selectables are examined moving backward through the list (not forward) starting with the selectable immediately preceding the current selection (steps 751, 768), until all selectables in the list preceding the current selection have been examined; (2) the amount of vertical overlap is calculated in order to determine whether a selectable, selectable__I, is "above" the current selection, not "below" (step 754); (3) selectable__I is ignored as a possible new current selection if the bottom of selectable__I is above the top of the current Best Guess (step 756); and, (4) if selectable__I is not currently displayed, the screen is scrolled up (not down) by a predetermined number (e.g., 100) of pixels.

III. Audio Functions

The application software 31 includes the capability to cause music and other sounds to be played through a speaker of the television set 12 based on audio data downloaded via the network connection 29. The downloaded audio data may be in any of a number of different formats, such as MIDI (Musical Instrument Digital Interface), MPEG (Moving Picture Experts Group), Real Audio, AU, AIFF, .WAV or others. Once decoded by the box 10, the received audio information is provided to the television set 12 via an audio channel of link 6.

A. Background Music

The WebTV service provides audio data to the box 10 for the purpose of providing background music or other sound effects (hereinafter simply "background music") to the user while the user is browsing the Web. The background music fills the audio channel of link 6, which would otherwise be unused, unless the user has activated a link to an audio file or a Web page provides its own background music. Hence, the background music provided by the WebTV service makes the Web browsing experience seem more like watching television to the user, since people are accustomed to hearing sound while viewing a television. In addition, background music is loaded into the client system asynchronously with, and independent of, the user's actions, so that the user does not have to wait to hear audio. Audio data for generating background music may be in one of the above-mentioned audio formats. The background music may be downloaded into RAM 23 and played immediately or simply retained for later use. Alternatively, downloaded audio files can be written into flash memory 22b. Background music played to the user may be generated from audio files that have been previously stored in memory, or from audio files that are being downloaded from the server 5 "on the fly", or a combination of these techniques.

Figure 11A:
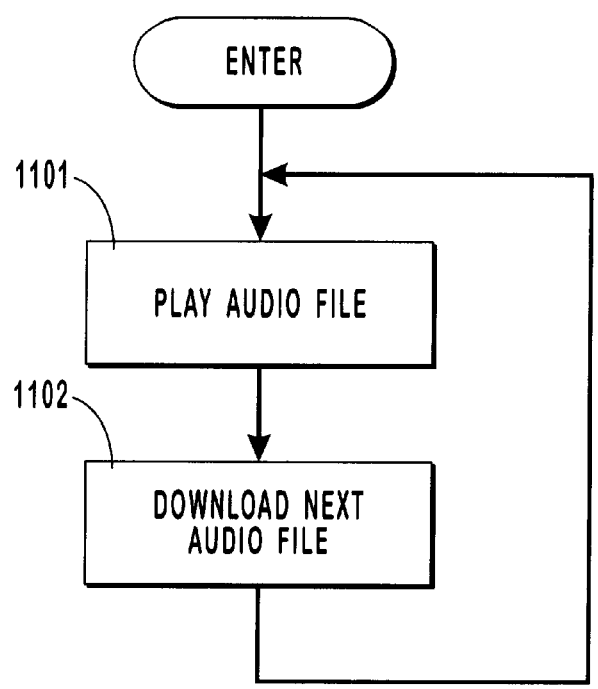
FIGS. 11 and 11B are flow diagrams illustrating routines for downloading and playing background music in a client system.
Figure 11B:
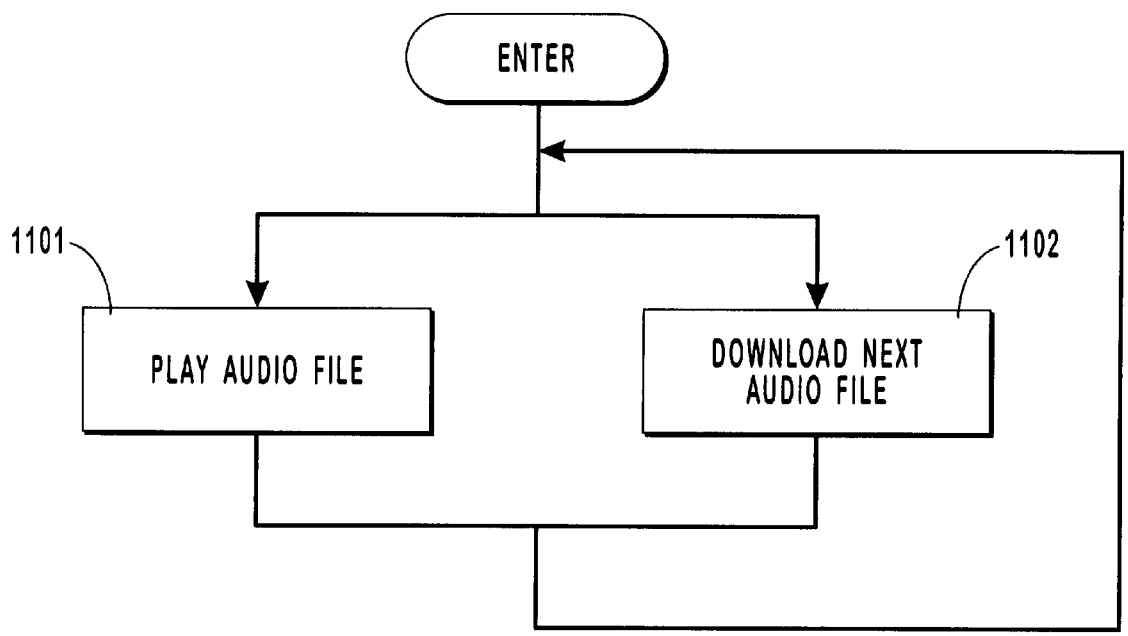

The background music is generally played to the user while the user is viewing Web pages and while Web pages are being downloaded. In one embodiment, which is illustrated by FIG. 11A, the file for generating one sequence of background music is downloaded from the server 5 (step 1102) only after the previous sequence of background music has finished playing (step 1101). This embodiment reduces memory consumption in the client system 1 in comparison to a second embodiment, which is illustrated in FIG. 11B. In the embodiment of FIG. 11B, a current sequence of background music is played to the user (step 1101) while the file for generating the next sequence is being downloaded from the server 5 (step 1102). Thus, the embodiment of FIG. 11B has the advantage of providing the user with a continuous, uninterrupted stream of background music.

The WebTV background music is suspended, however, whenever a displayed Web page provides its own background music, such that the background music associated with the Web page is played instead. Once the user leaves that Web page, the WebTV background music is resumed. In addition, if the user has accessed a particular hypertext link to an audio file, the WebTV background music is suspended while the accessed audio file is played.

In addition, the application software 31 also provides certain special sound effects. The special sound effects are superimposed upon (i.e., played concurrently with) the background music. Some of the sound effects are used to provide the user with audio feedback when operating the remote control 11. For example, a specific sound effect is associated with each function of the remote control 11. Audio feedback such as this is advantageous, since the user of the present invention will likely be positioned farther from the display than he would be if he were using an ordinary personal computer to browse the Web.

B. Audio Panel

Figure 8A:
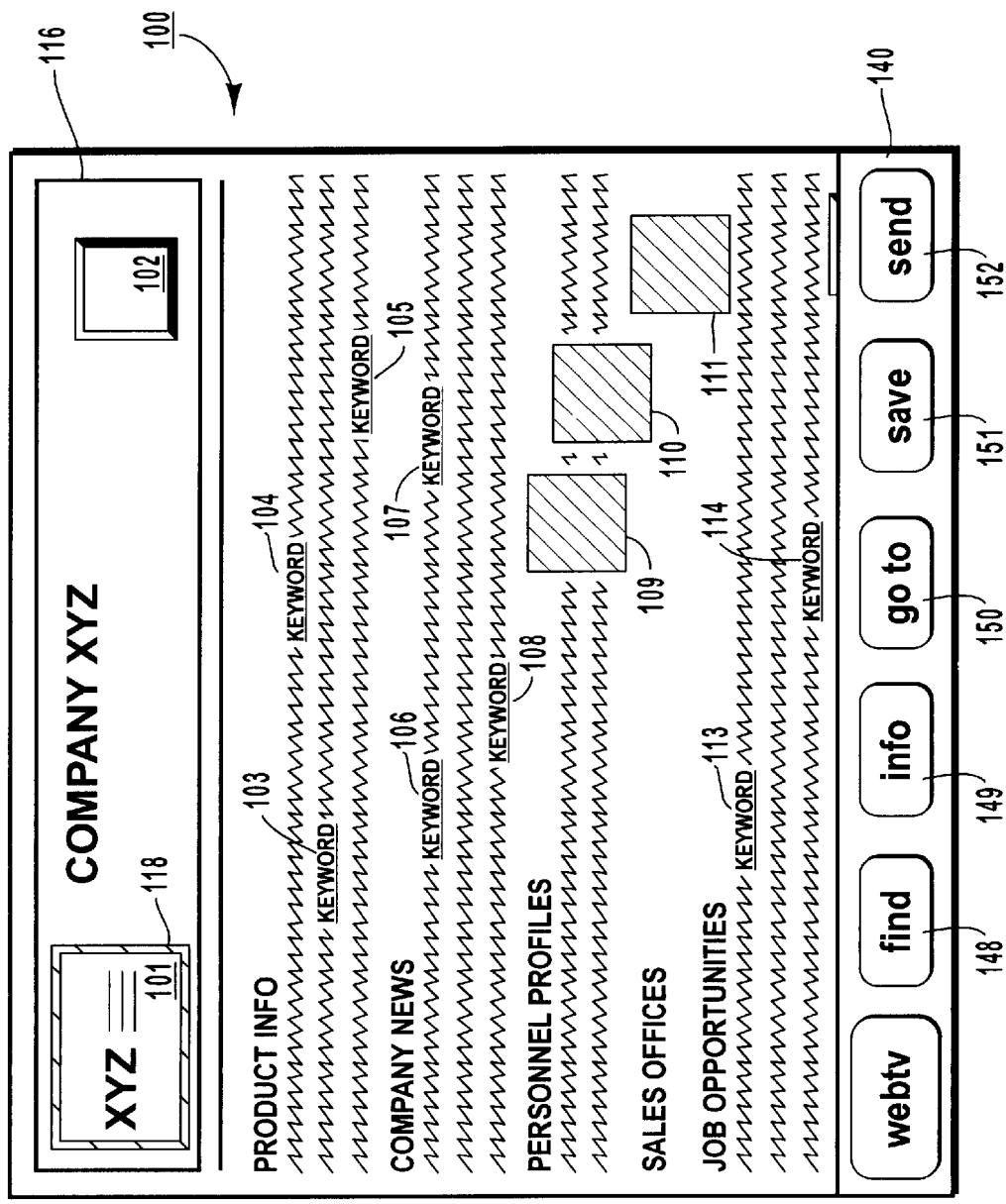
FIG. 8A illustrates an Options panel overlaid on a displayed Web page.
Figure 8B:
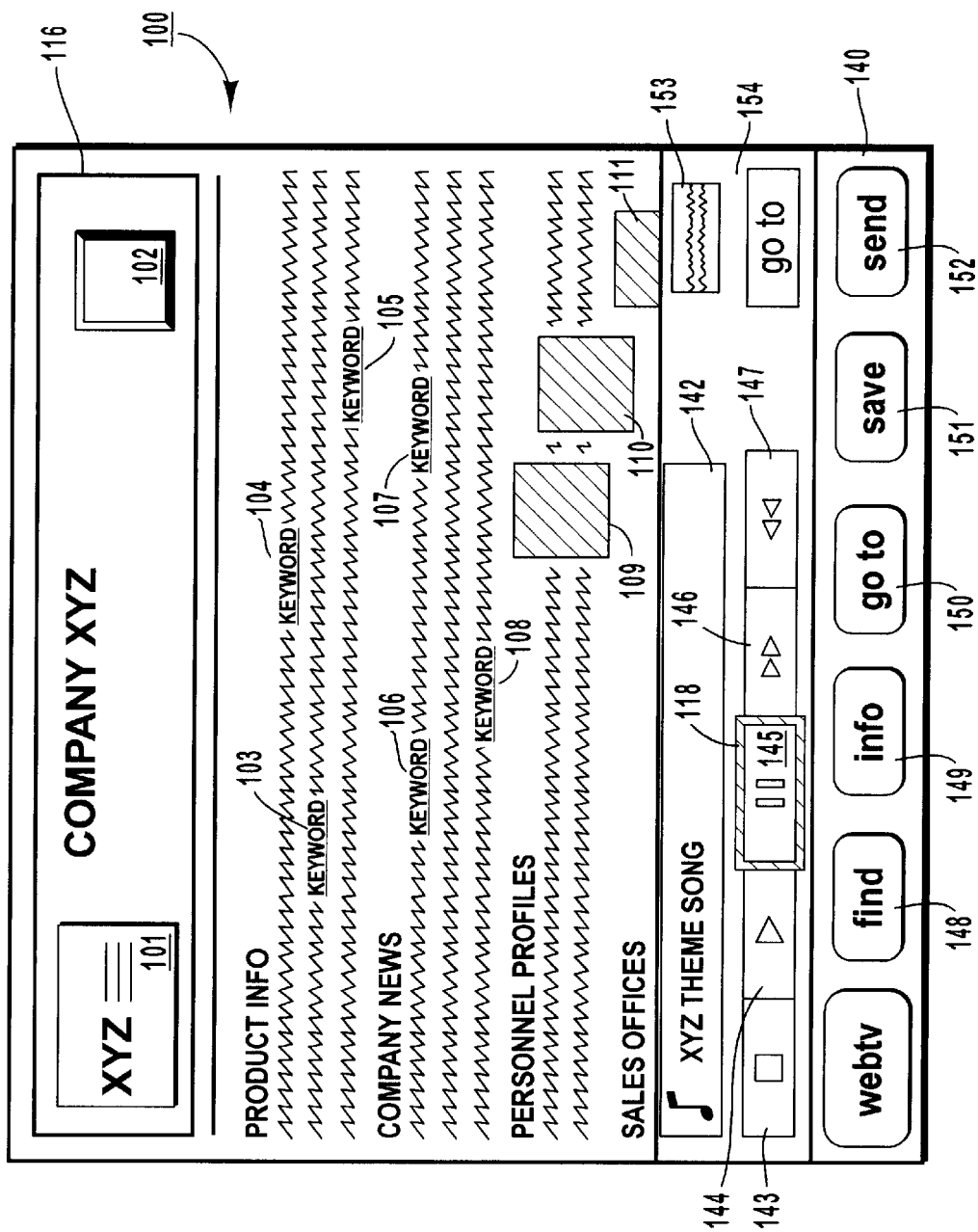
FIG. 8B illustrates an Options panel with an Audio panel overlaid on a displayed Web page.

The present invention includes a user interface for controlling audio functions related to audio files downloaded from the Web. This user interface is presented to the user in the form of an "Audio panel", which is illustrated in FIG. 8B. The audio panel is accessed by the user's pressing the Options button 7 on the remote control 11 when audio is available. In general, pressing the Options button 7 causes an Options panel to be displayed, as illustrated in FIG. 8A. The Options panel 140 is displayed as an overlay on a currently displayed Web page 100. The Options panel 140 provides the user with access to a number of managerial functions of the WebTV browser which are accessed by soft buttons 148–152. Buttons 148–152 are selected and activated by the use of the remote control 11 (more specifically, buttons 15–19 of remote control 11) in the manner described above.

Figure 9:
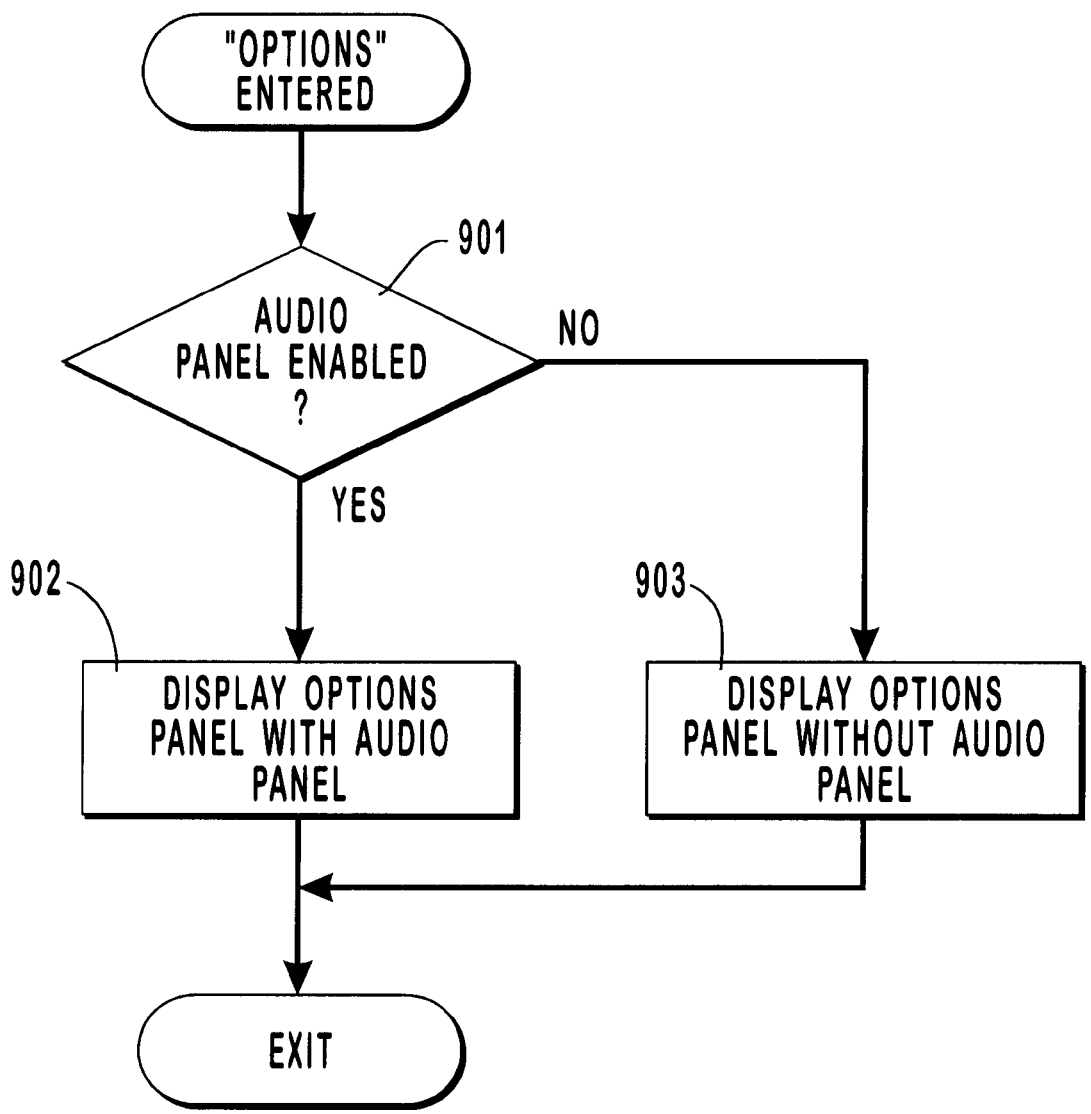
FIG. 9 is a flow diagram illustrating a routine for displaying an Options panel.

If the user activates the Options panel 140 while downloaded audio data is being played (in response to activating a hypertext link to an audio file), the Options panel will be displayed with an Audio panel 154, as illustrated in FIG. 8B. If the last hypertext link to be accessed did not link to audio data, then the Options panel 140 is displayed without the Audio panel 154, as illustrated in FIG. 8A. That is, the Audio panel 154 is enabled to be displayed only when there is audio data to be played. Thus, FIG. 9 illustrates a routine for displaying an Options panel. In response to the Options button 7 being pressed, if the Audio panel is enabled (step 901), then the Options panel is displayed with the Audio panel (step 902). If the Audio panel is not enabled (step 901), then the Options panel is displayed without the Audio panel (step 20 903).

The Audio panel 154 includes a title bar 142, a Stop button 143, a Play button 144, a Pause button 145, a Fast Forward button 146, a Rewind button 147, and an audio scope 153. As indicated by their names, buttons 143–147 are for controlling audio data and audio sequences (sound) generated from audio data (e.g.., playing an audio sequence, rewinding a audio sequence, etc.). The button that is currently selected at any point in time is indicated by highlighting 118. Buttons 143–147 are selected and activated by the use of the remote control (i.e., buttons 15–19 of remote control 11) in the manner described above. The title bar displays the title name of the audio file currently being played.

The audio scope 153 is a display of moving audio waveforms representing the audio sequence being played are displayed. In the case of stereo data, two waveforms are displayed, as illustrated in FIG. 8B, one waveform for the left audio channel and one waveform for the right audio channel. The waveforms are generated by converting the digital audio data into a graphical plot. The waveforms are scrolled horizontally across the audio scope 153 as the audio sequence is played, so that the sound the user is hearing at any point in time is represented by the waveforms currently displayed in the audio scope 153.

Figure 10:
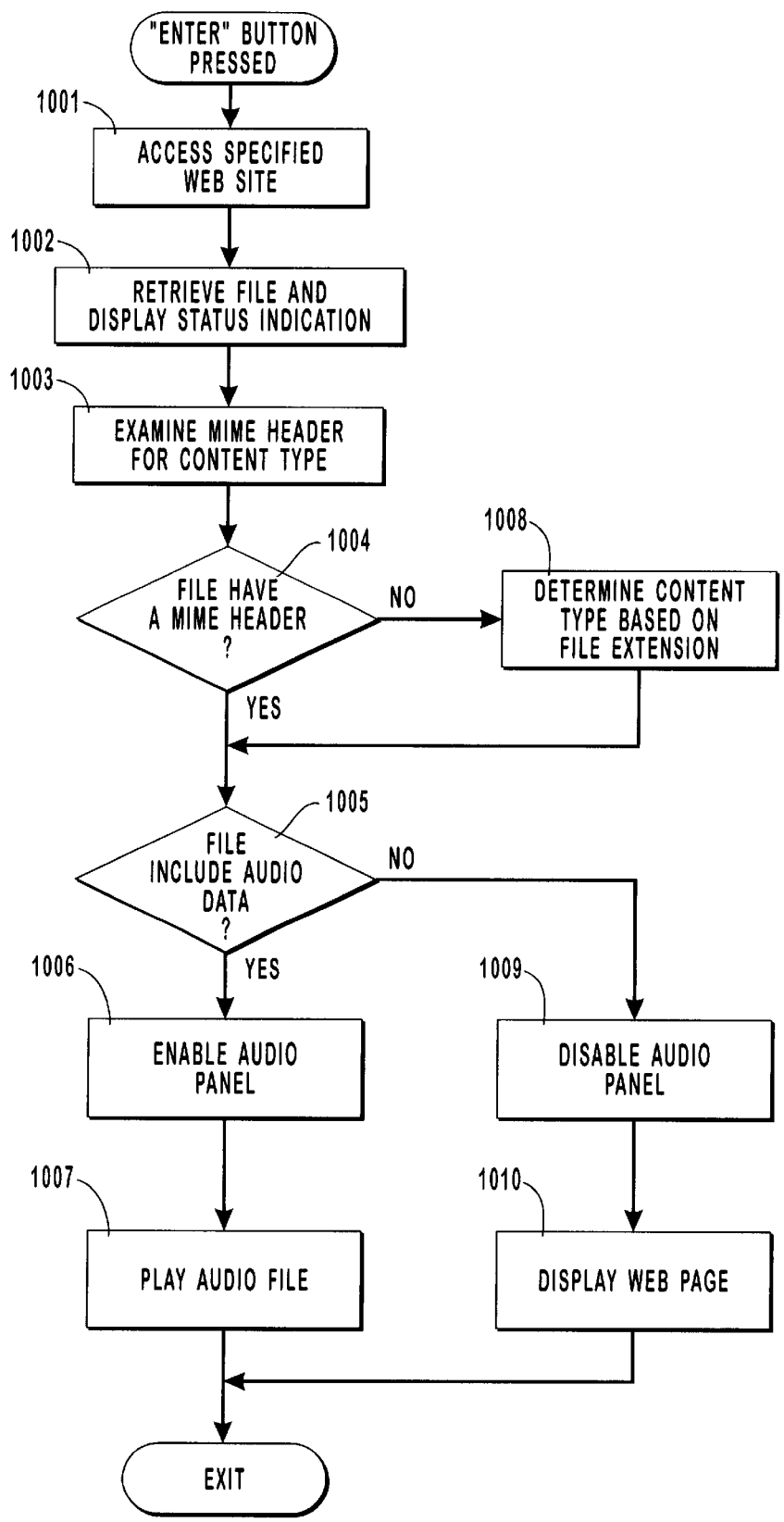
FIG. 10 is a flow diagram illustrating a routine for enabling or disabling display of an Audio panel.

FIG. 10 illustrates a routine for enabling or disabling display of the Audio panel when the user activates a hypertext anchor on a Web page. Initially, the Web site specified by the anchor's URL is accessed by the client system 1 (step 1001). The accessed file is then retrieved and a status indication is displayed on the screen during downloading to indicate how much of the file has been downloaded so far (step 1002). A downloaded HTML file will generally contain a MIME (Multi-purpose Internet Mail Extension) header, which specifies the content type of the file. Thus, after downloading the file, the client system 1 determines if the file contains a MIME header (step 1004). If the file contains a MIME header, the header is examined to determine the content type of the file (step 1005). If the file contains audio content, then the Audio panel is enabled (step 1006) and the audio file is played (step 1007). If the file does not contain audio content, then display of the audio panel is disabled (step 1009), and the retrieved file is displayed normally (step 1010).

If (in step 1004) the file does not contain a MIME header, the client system 1 determines the content type by examining the file extension of the downloaded file, if any. For example, the file extensions AU, .WAV, and AIFF indicate audio content. After determining the content type from the file extension, the routine proceeds as described above (from step 1005).

The client system 1 has the ability to determine whether a particular audio function, such as Rewind, Pause, or Fast Forward, applies to a given downloaded file. For example, the Fast Forward function (button 146) does not apply to a live audio stream, such as Real Audio. Therefore, for situations in which a particular audio function does not apply, the corresponding button is automatically disabled (i.e., not displayed or displayed in a manner that indicates the function is unavailable).

In one embodiment, the user can save into memory an audio file that has been accessed from a Web site. For example, the user can save such an audio file as a background music file, so that the file is automatically played as part of a repeating sequence of background music selections. A downloaded audio file may be saved into memory using the Save button 151 displayed on the Options panel.

Thus, a method and apparatus for providing a user interface to control audio functions in a Web browser have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a client processing system coupled to at least one server processing system over a network, wherein the client processing system is coupled to a display device, a method of providing a user interface for controlling audio functions of the client processing system, the method comprising the steps of:

determining that the client processing system is receiving audio data from a server processing system;

determining whether the audio data comprises a live audio stream; and in response to determining that the client system is receiving audio data from a server processing system, displaying on the display device an audio control panel that provides a user interface for allowing a user to control a plurality of audio functions associated with the audio data, wherein, if it has been determined that the audio data comprises a live audio stream, at least one audio function that does not apply to live audio streams is disabled on the audio control panel by displaying a corresponding button on the audio control panel in a manner that indicates that the at least one audio function is unavailable.

2. A method according to claim 1, wherein the step of displaying the audio control panel is conducted only when it is determined that the client processing system is receiving the audio data, such that, prior to receiving the audio data, the audio control panel is not displayed.

3. A method according to claim 1, wherein the client processing system is further coupled to an audio output device, the method further comprising the steps of:
   causing an audio sequence encoded by the audio data to be output via the audio output device; and
   disabling display of the audio control panel upon completion of outputting the audio sequence.

4. A method according to claim 1, wherein the audio control panel includes a plurality of displayable objects, each of the objects representing one of the audio functions.

5. A method according to claim 4, further comprising the step of determining whether each of the audio functions can be performed with respect to the audio data.

6. A method according to claim 5, further comprising the step of disabling a display of one of the displayable objects if a corresponding one of the audio functions cannot be performed with respect to the audio data.

7. A method according to claim 1, further comprising, prior to the client processing system receiving the audio data:
   representing the audio data by a hypertext anchor displayed on the display device;
   receiving user input selecting the hypertext anchor displayed on the display device; and
   in response to the user input, requesting the audio data from the server processing system.

8. A method according to claim 1, wherein the display device comprises a television set.

9. A client processing system for communicating over a network with at least one server processing system, the client processing system coupled to a display device, the client processing system comprising:
   a processor; and
   a memory coupled to the processor, the memory having stored therein sequences of instructions which, when executed by the processor, cause the processor to perform the steps of:
   retrieving audio data from the server processing system;
   determining whether the retrieved audio data comprises a live audio stream; and
   upon receiving the retrieved audio data, displaying on the display device an audio control panel that includes a plurality of objects, wherein each of the objects, when selected by a user, activates one of a plurality of audio functions that can be applied to the audio data, wherein, if it has been determined that the audio data comprises a live audio stream, at least one audio function that does not apply to live audio streams is disabled on the audio control panel by displaying a corresponding button on the audio control panel in a manner that indicates that the at least one audio function ia unavailable;
   receiving a user input designating one of the objects; and
   in response to the user input, performing one of the audio functions.

10. A client processing system according to claim 9, wherein the sequences of instructions, when executed by the processor, further cause the processor to perform the following steps before the step of retrieving audio data from the server processing system:
   causing a plurality of hypertext objects to be displayed on the display device; and
   receiving a user input selecting one of the hypertext objects, wherein the hypertext object represents the audio data retrieved from the server processing system.

11. A client processing system according to claim 9, wherein the display device comprises a television set.

12. A client processing system according to claim 9 wherein the client processing system is also coupled to an audio output device, wherein the sequences of instructions for performing the step of performing one of the audio functions, when executed by the processor, further cause the processor to perform the step of causing an audio sequence to be output to the audio output device based on the audio data.

13. In a client processing system coupled to a server processing system over a network and coupled to a display device, a method of providing a user interface for controlling audio functions of the client processing system, the method comprising the steps of:
   receiving user input designating that an audio control panel is to be automatically displayed on the display device if audio information is being downloaded from the network;
   downloading audio information from the network;
   determining whether the downloaded audio information comprises a live audio stream; and
   in response to receiving the downloaded audio information, automatically displaying the audio control panel on the display device, the audio control panel including a plurality of displayable objects, wherein each of the displayable objects, when selected by a user, activates one of a plurality of audio functions that can be applied to the downloaded audio information, wherein, if it has been determined that the downloaded audio information comprises a live audio stream, at least one audio function that does not apply to live audio streams is disabled on the audio control panel by displaying a corresponding button on the audio control panel in a manner that indicates that the at least one audio function is unavailable.

14. A method according to claim 13, wherein the audio information is accessed over the network by a hypertext link.

15. A method according to claim 13, wherein the audio control panel is displayed only if an audio sequence is currently being output by the client processing system.

16. A method according to claim 13 wherein the display device comprises a television display.

17. A method according to claim 16 wherein the user input is entered from a remote input device.

18. A method according to claim 16 wherein the user input is entered from a remote input device by a user activating a control specifying a direction for moving a selection indicator displayed on the display device from a previous position on the display device.

19. A method according to claim 13, wherein the client processing system is further coupled to an audio output device, the method further comprising the steps of:
   causing an audio sequence to be output from the audio output device based on the audio information; and
   causing a moving waveform representing the audio sequence to be displayed on the display device as the audio sequence is output.

20. A method according to claim 13 wherein the step of automatically displaying an audio control panel on the display device comprises the step of causing a moving waveform representing an audio sequence of the audio information to be displayed on one of the displayable objects as the audio sequence is output by the client processing system.

21. A method according to claim 1, wherein the at least one audio function that is disabled on the audio control panel if it is determined that the audio data comprises a live audio stream is a fast forward function.

22. A method according to claim 1, wherein the display device comprises a television set.

23. A client processing system according to claim 9, wherein the at least one audio function that is disabled on the audio control panel if it is determined that the audio data comprises a live audio stream is a fast forward function.

24. A method according to claim 13, wherein the at least one audio function that is disabled on the audio control panel if it is determined that the downloaded audio information comprises a live audio stream is a fast forward function.

25. In a networked computer system that includes a plurality of servers and a plurality of clients that are interconnected with the plurality of servers, one or more of the plurality of clients including a processor that provides a graphical user interface displayed on a television set, enabling information from the Internet to be displayed thereon, a method of a method of providing a user interface for controlling audio functions associated with audio data, the method comprising the acts of:

at one of the plurality of clients, determining that said one of the plurality of clients is receiving audio data from one of the plurality of servers;

determining whether the audio data comprises a live audio stream; and in response to determining that said one of the plurality of clients is receiving audio data, displaying, on a display device associated with said one of the plurality of clients, an audio control panel that provides a user interface for allowing a user to control a plurality of audio functions associated with the audio data, wherein, if it has been determined that the audio data comprises a live audio stream, at least one audio function that does not apply to live audio streams is disabled on the audio control panel, by displaying a corresponding button on the audio control panel in a manner that indicates that the at least one audio function is unavailable so as to communicate to the user whether the at least one audio function applies to the audio data.

26. A method according to claim 25, wherein the display device associated with said one of the plurality of clients comprises a television set.

27. A method according to claim 25, wherein the at least one audio function that is disabled on the audio control panel if it is determined that the audio data comprises a live audio stream is a fast forward function.

* * * * *

UNITED STATES PATENT AND TRADEMARK OFFICE
CERTIFICATE OF CORRECTION

PATENT NO. : 6,496,205 B1  Page 1 of 1
DATED : December 17, 2002
INVENTOR(S) : White et al.

It is certified that error appears in the above-identified patent and that said Letters Patent is hereby corrected as shown below:

Drawings,
FIG. 7A, Step 703, before "<(1/2* MIN (HEIGHT" replace "SLECTABLE_1" with -- SELECTABLE_1 --
FIG. 7c, Step 753, before "<(1/2* MIN (HEIGHT" replace "SLECTABLE_1" with -- SELECTABLE_1 --

Column 15,
Line 29, after "(step" please delete "20"
Line 36, after "rewinding" replace "a" with -- an --
Line 39, after "the use of the remote control" please insert -- 11 --

Column 17,
Line 53, after "one audio function" replace "ia" with -- is --

Signed and Sealed this

Sixth Day of January, 2004

JAMES E. ROGAN
*Director of the United States Patent and Trademark Office*